United States Patent [19]
Giger et al.

[11] Patent Number: 5,881,124
[45] Date of Patent: Mar. 9, 1999

[54] AUTOMATED METHOD AND SYSTEM FOR THE DETECTION OF LESIONS IN MEDICAL COMPUTED TOMOGRAPHIC SCANS

[75] Inventors: Maryellen L. Giger, Elmhurst, Ill.; Kyongtae Ty Bae, St. Louis, Mo.; Kunio Doi, Willowbrook, Ill.

[73] Assignee: Arch Development Corporation, Chicago, Ill.

[21] Appl. No.: 220,917

[22] Filed: Mar. 31, 1994

[51] Int. Cl.$^6$ .................................................... A61B 6/03
[52] U.S. Cl. ............................ 378/8; 378/901; 250/363.4
[58] Field of Search .................................... 378/4, 8, 901; 364/413.14; 382/131; 250/363.04

[56] References Cited

U.S. PATENT DOCUMENTS

| | | | |
|---|---|---|---|
| 4,777,598 | 10/1988 | Kellar et al. | 364/413.22 |
| 4,907,156 | 3/1990 | Doi et al. | |
| 5,133,020 | 7/1992 | Giger et al. | 382/128 |
| 5,146,923 | 9/1992 | Dhawan | 128/633 |
| 5,185,809 | 2/1993 | Kennedy et al. | 362/131 |
| 5,319,549 | 6/1994 | Katsuragawa et al. | |

FOREIGN PATENT DOCUMENTS

WO 95/15536  6/1995  WIPO.

OTHER PUBLICATIONS

Proceedings of the Second International Joint Conference on Pattern Recognition, Aug. 13–15, 1974, Copenhagen; IEEE, Washington, 1974, pp. 258–263, XP002023478, D. H. Ballard et al.; "Hierarchic Recognition of Tumors in Chest Radiographs".

Computer Vision Graphics and Image Processing, vol. 43 No. 2, Aug., 1988, MA US, pp. 256–264, XP000004392, S.M. Ali et al., "A New Algorithm for Extracting the Interior of Bounded Regions Based on Chain Coding".

*Primary Examiner*—David P. Porta
*Assistant Examiner*—David Vernon Bruce
*Attorney, Agent, or Firm*—Oblon, Spivak, McClelland, Maier & Neustadt, P.C.

[57] ABSTRACT

A method and system for the automated detection of lesions in computed tomographic images, including generating image data from at least one selected portion of an object, for example, from CT images of the thorax. The image data are then analyzed in order to produce the boundary of the thorax. The image data within the thoracic boundary is then further analyzed to produce boundaries of the lung regions using predetermined criteria. Features within the lung regions are then extracted using multi-gray-level thresholding and correlation between resulting multi-level threshold images and between at least adjacent sections. Classification of the features as abnormal lesions or normal anatomic features is then performed using geometric features yielding a likelihood of being an abnormal lesion along with its location in either the 2-D image section or in the 3-D space of the object.

43 Claims, 25 Drawing Sheets

AUTOMATED METHOD AND SYSTEM FOR THE DETECTION OF LESIONS IN MEDICAL COMPUTED TOMOGRAPHIC SCANS

BACKGROUND OF THE INVENTION

1. Field of the Invention

This invention relates to a method and system for automated processing of medical tomographic images using feature-analysis techniques, and more particularly, to an automated method and system for the detection of lesions in computed tomographic (CT) scan images of the lungs.

2. Discussion of the Background

The cure of lung cancer depends upon detection at an early stage while the tumor is still small and localized. If the cancer is detected in this localized stage, the five-year survival rate is approximately 80% as opposed to an otherwise 10% survival rate. The detection of cancerous lung nodules in chest radiographs and CT images is one of the more difficult tasks performed by radiologists.

Conventional interpretation of CT scans of the thorax is a time-consuming task for radiologists, requiring a systematic visual search of up to 80 images (40 "lung" images and 40 "soft tissue" images). In addition, when a possible nodule is located in one CT image, the radiologist frequently must perform visual correlation of the image data with that of other images (sections), in order to eliminate the possibility that the "nodule" actually represents a blood vessel seen in cross section.

At surgery, it is common for more pulmonary nodules to be found than were located by CT. Nodules may be missed in CT images due to factors such as a failure to perform the necessary systematic search, or an understandable inability to assimilate the vast amount of information contained in the multiple images in a CT examination. A computerized scheme for the detection of nodules is especially important in the case of searching for a solitary nodule.

Although no generalized scheme for automatically segmenting organs has been proposed, various investigations of knowledge-based segmentation of specific organs have been described in the literature. Karssemeijer et al. in "Recognition of organs in CT-image sequences: A model guided approach," Computers and Biomed. Res., 21, 434–438 (1988), used a Markov random field image model to segment the spleen in abdominal CT scans. Shani applied generalized-cylinder organ models for recognition of 3-D structure in abdominal CT (Understanding 3-D images: Recognition of abdominal anatomy from CAT scans, UMI research Press, Ann Arbor, 1983). Stiehl ("Model-guided labeling of CSF-cavities in cranial computed tomograms," in Computer Assisted Radiology '85, edited H. U. Lemke et al., Springer-Verlag, Berlin, 1985) and Badran et al. ("Patient realignment in MRI of the head: an algorithm using mathematical morphology for feature extraction," J. Biomed. Eng., 12 (2), 139–142 (1990)) described techniques for extracting brain features from CT and MRI, respectively. Levin et al. investigated detectability of soft-tissue tumors using multi-spectral feature space classification based on multiple MR sequences ("Musculoskeletal tumors: improved depiction with linear combinations of MR images," Radiology 163, 545–549, 1987). Of these approaches, none used a multi-gray-level thresholding and decision tree (for comparison and correlation) to detect lesions of varying subtlety. In addition, none used comparison between CT sections (i.e., multiple cross-sectional sections) to aid in distinguishing lesions from normal anatomy (such as blood vessels).

SUMMARY OF THE INVENTION

Accordingly, an object of this invention is to provide an automated method and system for detecting and displaying abnormal lesions in medical CT images.

A second object of this invention is to provide an automated method and system for detecting and displaying abnormal lesions in medical CT images of the lung.

Another object of this invention is to provide an automated method and system for the detection of the thoracic boundaries within a CT scan image of the thorax.

Another object of this invention is to provide an automated method and system for the detection of lung boundaries within a CT scan image of the thorax.

Another object of this invention is to provide an automated method and system for the extraction of objects (features) within the lung regions in CT scan images of the thorax by using multi-level, gray-scale thresholding and the correlation and classification of such features using multi-level decision trees.

Another object of this invention is to provide an automated method and system for distinguishing abnormal lesions from normal anatomy (such as blood vessels) using a tree structure technique and a degree of likelihood for the comparison between adjacent CT image sections.

These and other objects are achieved according to the invention by providing a new and improved automated method and system in which prior to feature analysis, a multi-level gray level thresholding is performed with which to extract the features. For example, lung nodules may present on the CT section image in different degrees of subtly due to size and composition. In order to allow the various lesions to be detected, they must be analyzed at different threshold levels.

Further according to the invention, once the features are extracted, analysis of the features is performed in order to distinguish abnormal lesions from normal anatomy. Relationships and correlations between different threshold levels as well as between different CT sections is used.

BRIEF DESCRIPTION OF THE DRAWINGS

A more complete appreciation of the invention and many of the attendant advantages thereof will be readily obtained as the same becomes better understood by the reference to the following detailed description when considered in connection with the accompanying drawings, wherein.

DETAILED DESCRIPTION OF THE PREFERRED EMBODIMENTS

Figure 1:
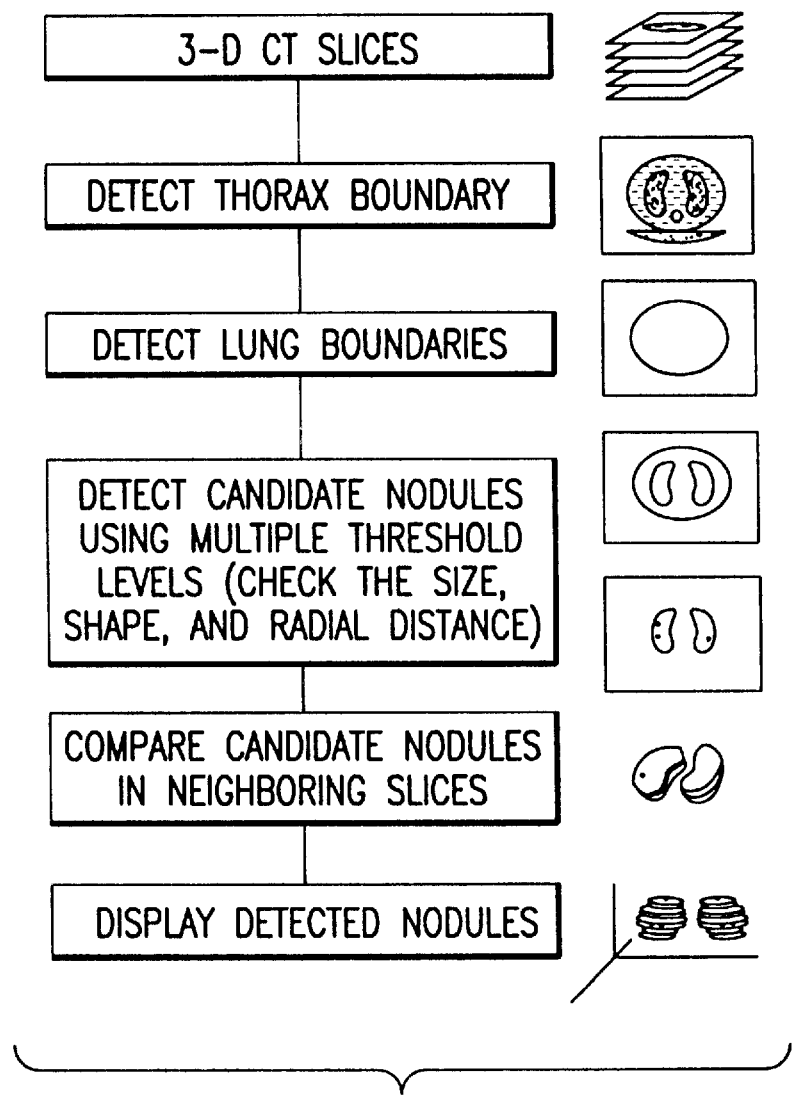
FIG. 1 is a schematic diagram illustrating the automated method for lesion detection according to the invention.

Referring now to the drawings, and more particularly to FIG. 1 thereof, a schematic diagram of the automated method for the detection of pulmonary nodules in CT images of the thorax is shown. The overall scheme includes an initial acquisition of a set of CT sections of the thorax (step 10). Detection is performed sequentially, section by section. In each section, the thoracic (step 11) and lung boundaries (step 12) are detected, and the features within the lung boundaries are subjected to multiple gray-level thresholding (step 13). By analyzing the relationships between features arising at different threshold levels with respect to their shape, size and location, each feature is assigned a likelihood of being either a nodule or a vessel. Features in adjacent sections are compared to resolve ambiguous features (step 14). Detected nodule candidates are then displayed (step 15), preferably in 3 dimensions within the lung.

Figure 2A:
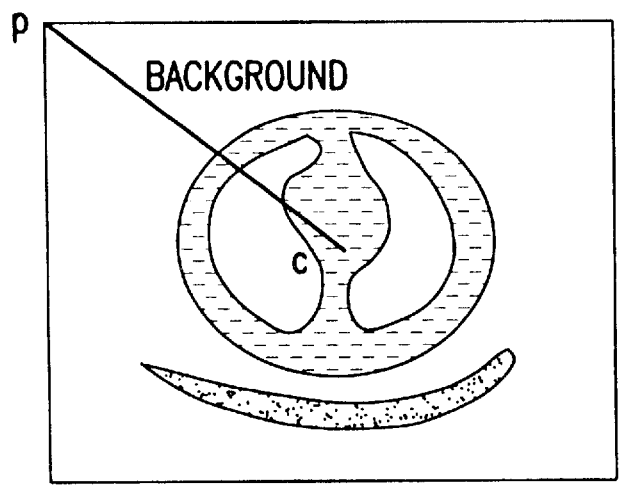
FIGS. 2A and 2B are schematic diagrams illustrating the automated method for the detection of the boundary of the thorax according to the invention.
Figure 2B:
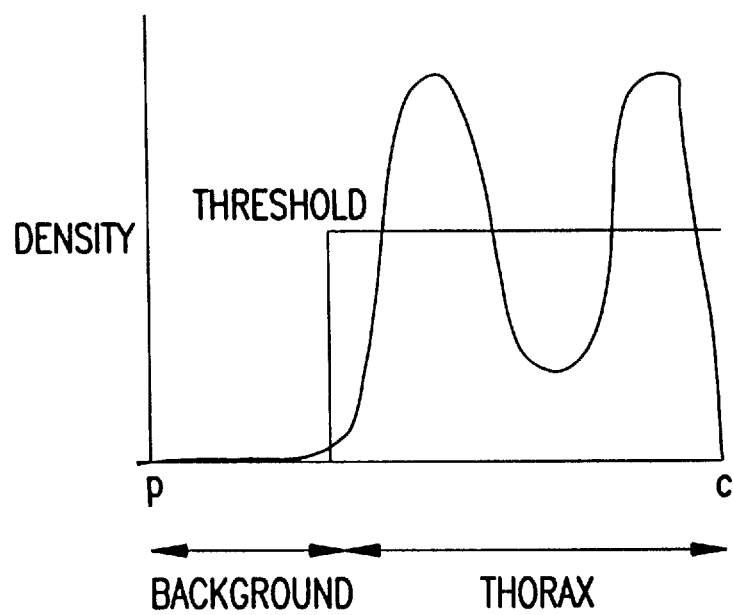
Figure 3:
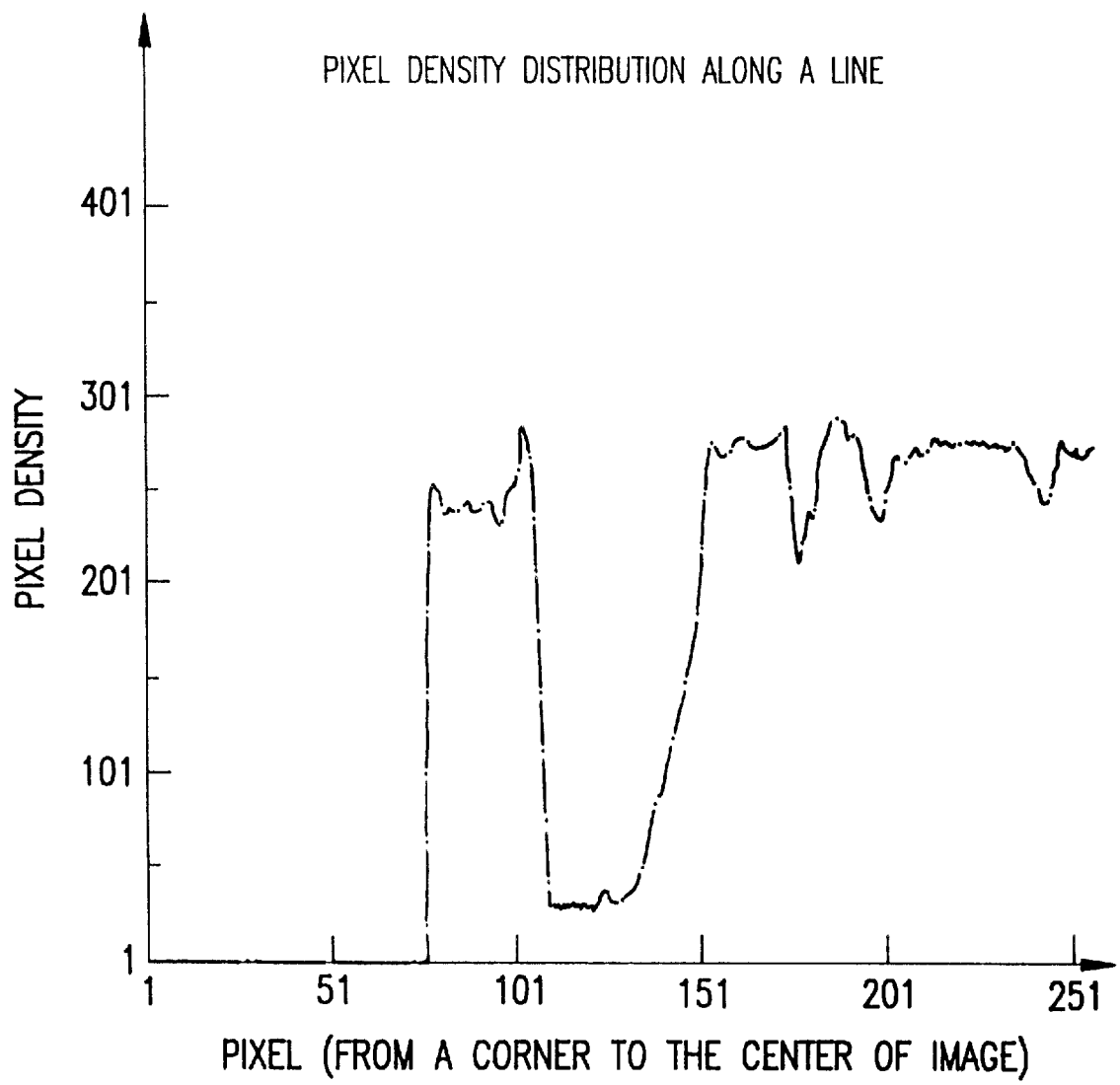
FIG. 3 is a graph illustrating the pixel density distribution along a line from the corner to the center of the CT image.

FIGS. 2A and 2B show a schematic diagram of the method for the detection of the thoracic boundary. The thorax is separated from the external background using gray-level thresholding techniques. One can assume that the thorax is approximately centered in the image section. A histogram of the gray values of pixels along a line from the center of the image to an edge of the image is calculated and used in determining the section-specific gray-level threshold. The histogram is shown schematically in FIG. 2B and an actual histogram is shown in FIG. 3. The thorax region is well separated from the background region in the gray-level histogram. An appropriately chosen threshold (FIG. 2B) eliminates most of the pixels corresponding to the background.

Figure 4A:
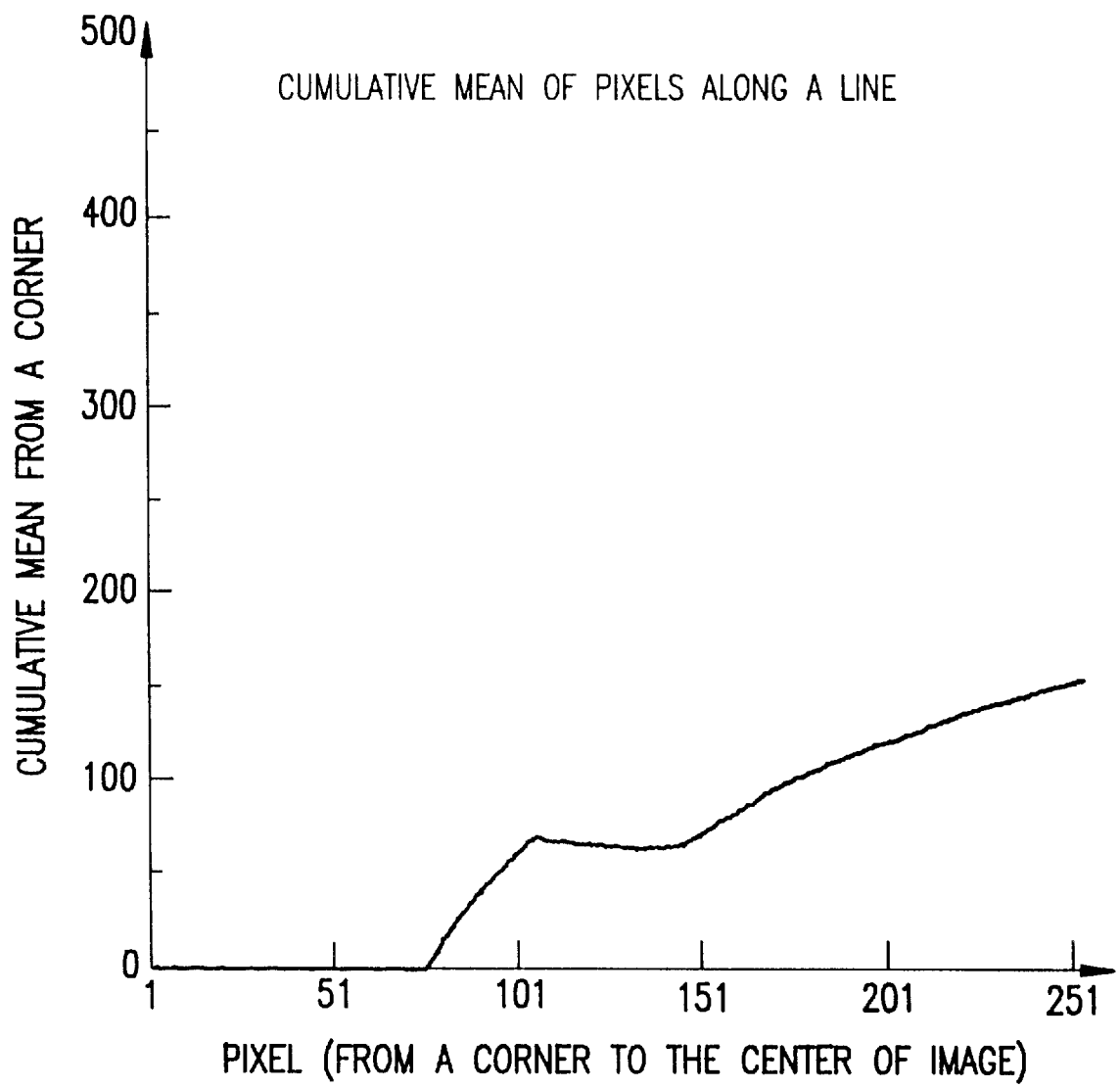
FIGS. 4A–4C are graphs illustrating the cumulative mean of pixels along a line from the a corner to the center of the image, the cumulative mean of pixels along a line from the center back to the corner of the image and the difference between these two cumulative mean plots, respectively.
Figure 4B:
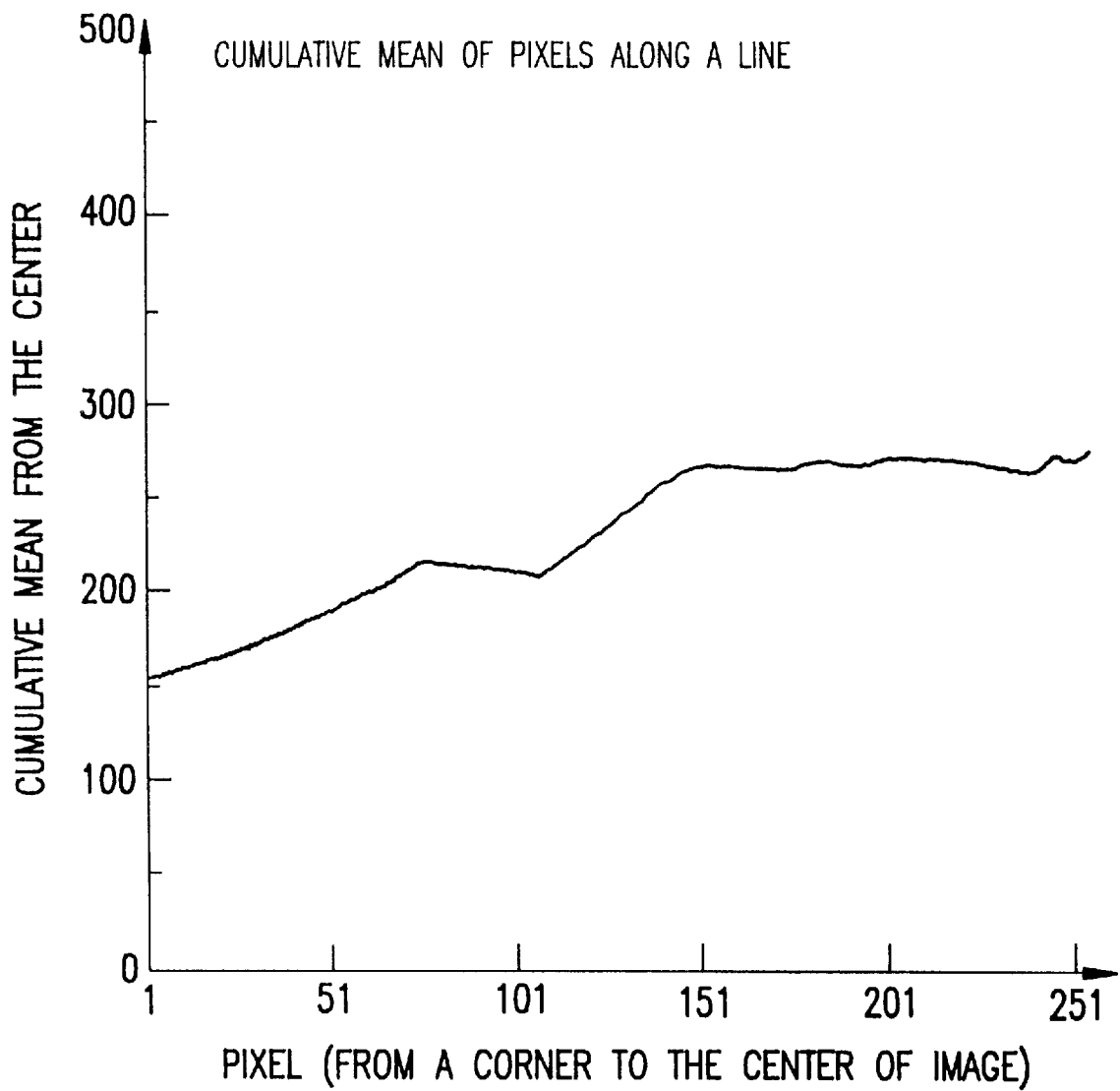
Figure 4C:
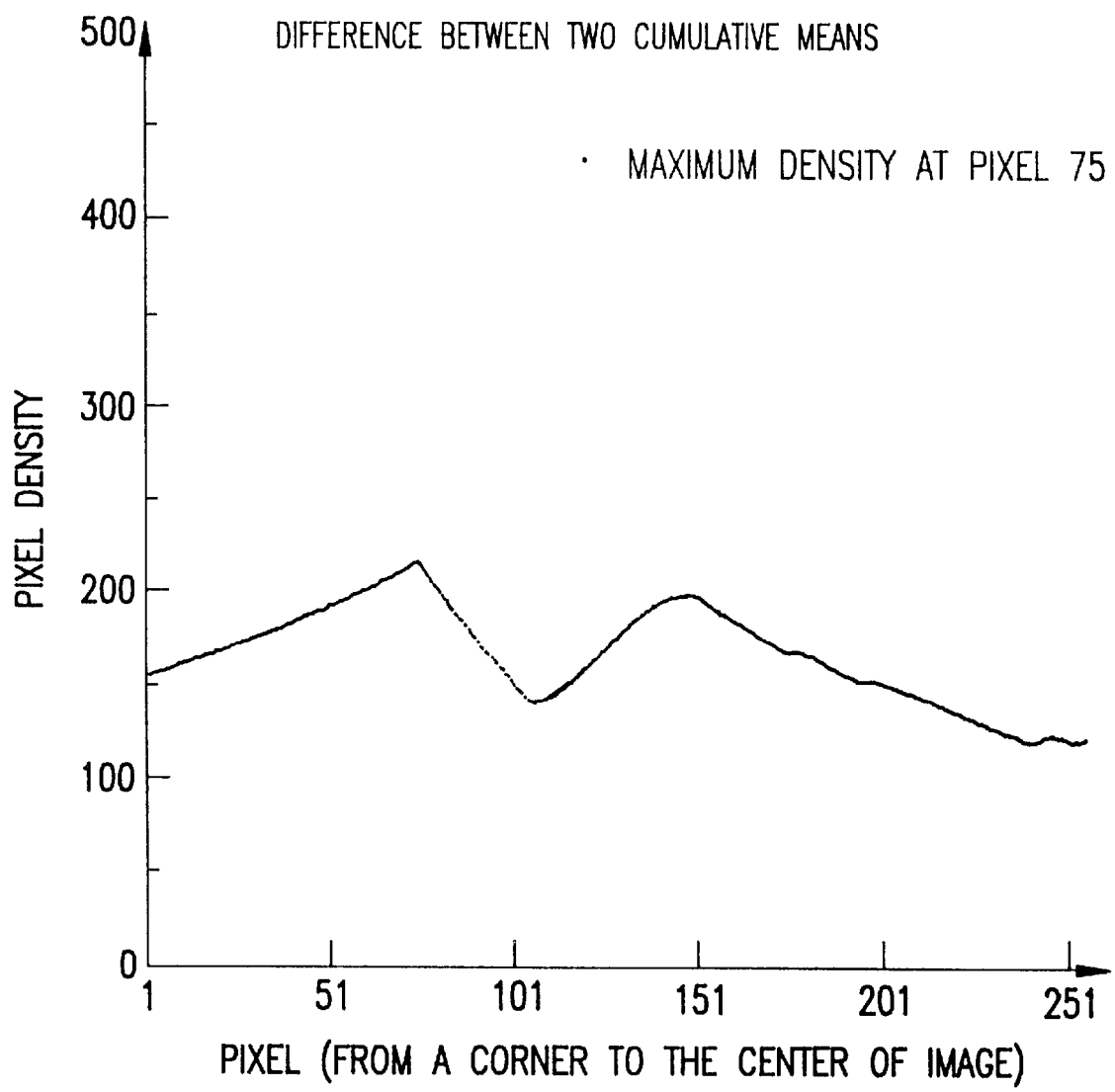

The cumulative means along the line from the corner to the center of the image and vice versa are calculated (FIGS. 4A and 4B), especially in cases where the CT image is noisy. The cumulative means are calculated by adding the pixel values from the corner to the center and from the center to the corner and taking the running average. The difference between these two cumulative means along the line from a corner to the center of the image (FIG. 4C) can be used to better estimate the section-specific gray-level threshold, which is chosen at the dip in the curve (roughly at the pixel location of 101 in FIG. 4C).

Using the determined section-specific gray-level threshold, a binary image is generated and boundaries of globally connected regions are delineated using an 8-point connectivity border tracker. This process assumes there is some type of connectivity among pixels in a region. Pixels are selected as belonging to the region only if they adjacent (touching).

Figure 5A:
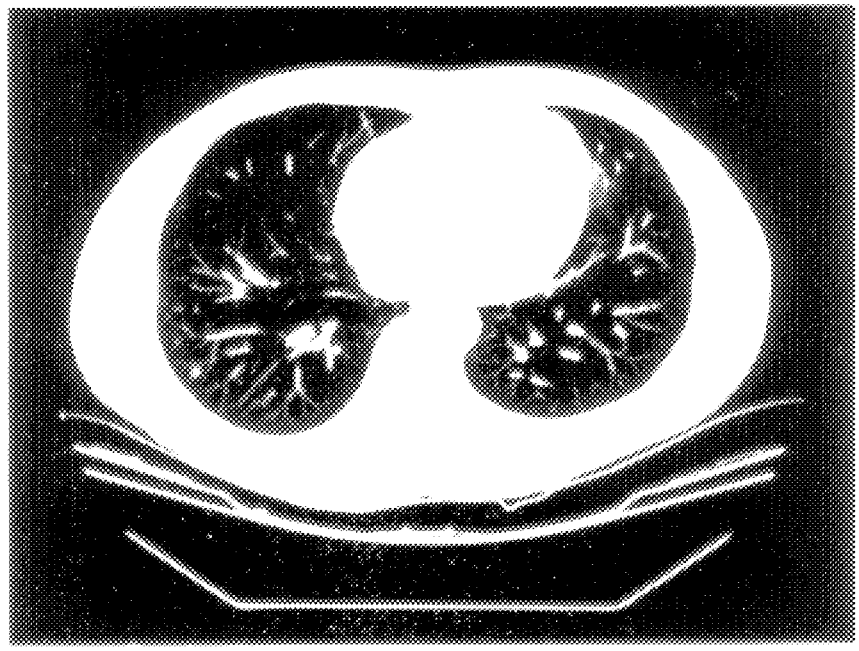
FIGS. 5A and 5B are illustrations of a CT image and its detected thoracic boundary, respectively.
Figure 5B:
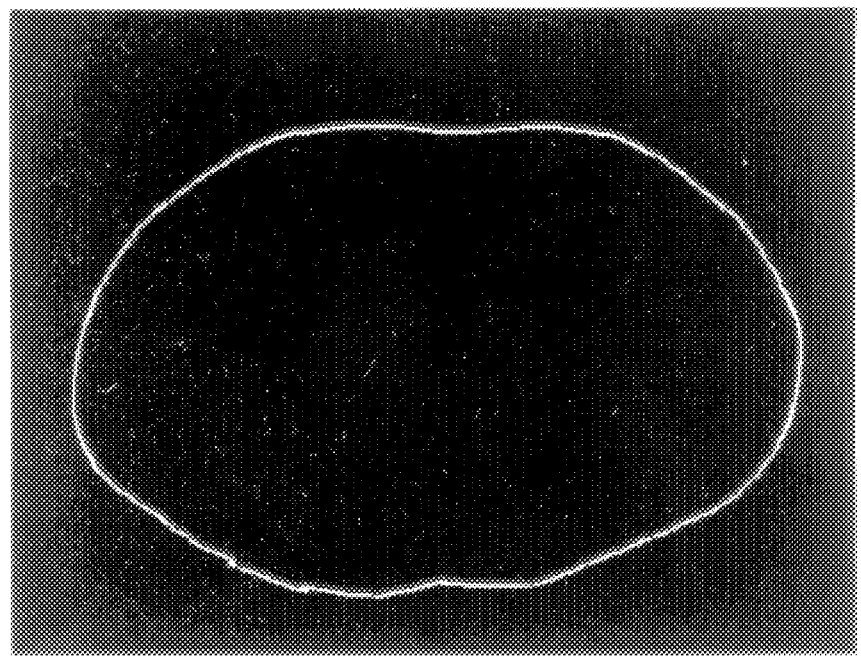

In order to eliminate contours (boundaries) that arise from the exam table, each detected contour is examined with respect to geometrical constraints including size and circularity. In the embodiment, a minimum size for a region of ¼ of the image size was selected in order to be classified as the thorax. Further, a compactness measure (described in more detail below) was selected as being at least 20%. FIG. 5A shows a CT image and FIG. 5B shows the corresponding detected thoracic boundary.

Figure 6A:
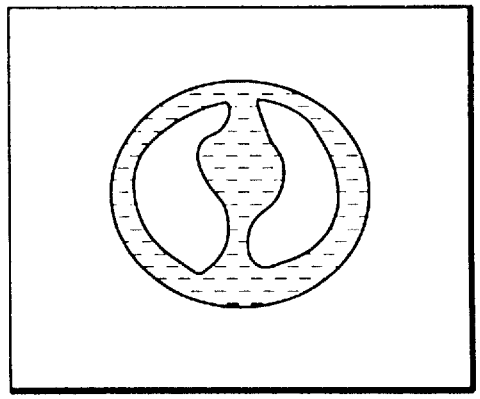
FIGS. 6A and 6B are schematic diagrams illustrating the automated method for the detection of the lung boundaries according to the invention.
Figure 6B:
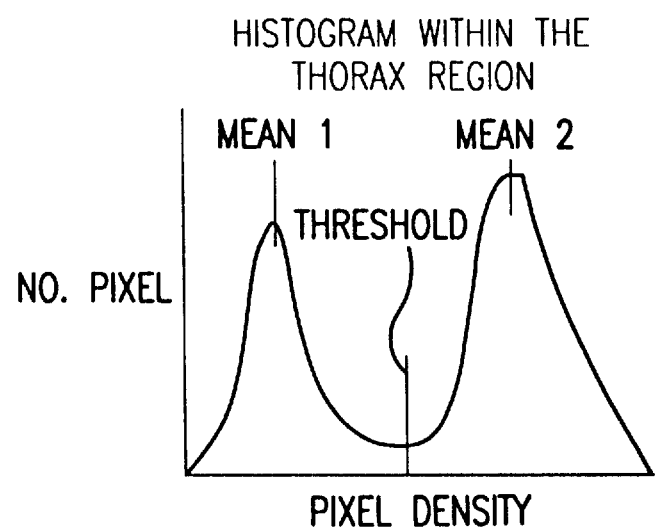

FIG. 6 shows a schematic diagram of the method for the detection of lung boundaries within the thorax according to the invention. The lung region is identified within the thorax region by using gray-level thresholding techniques. Once the thorax region is determined, the gray-level histogram of pixels within the region is calculated. This histogram will contain a bimodal distribution (i.e., two peaks) with one group of pixels corresponding to the aerated lungs and the other group corresponding to the mediastinum and chest wall (shown schematically in FIG. 6B). A gray-level threshold is calculated from the histogram which provides the maximum separation between the two groups. The maximum separation is determined as:

(mean2−threshold)×(threshold−mean1)

Figure 7:
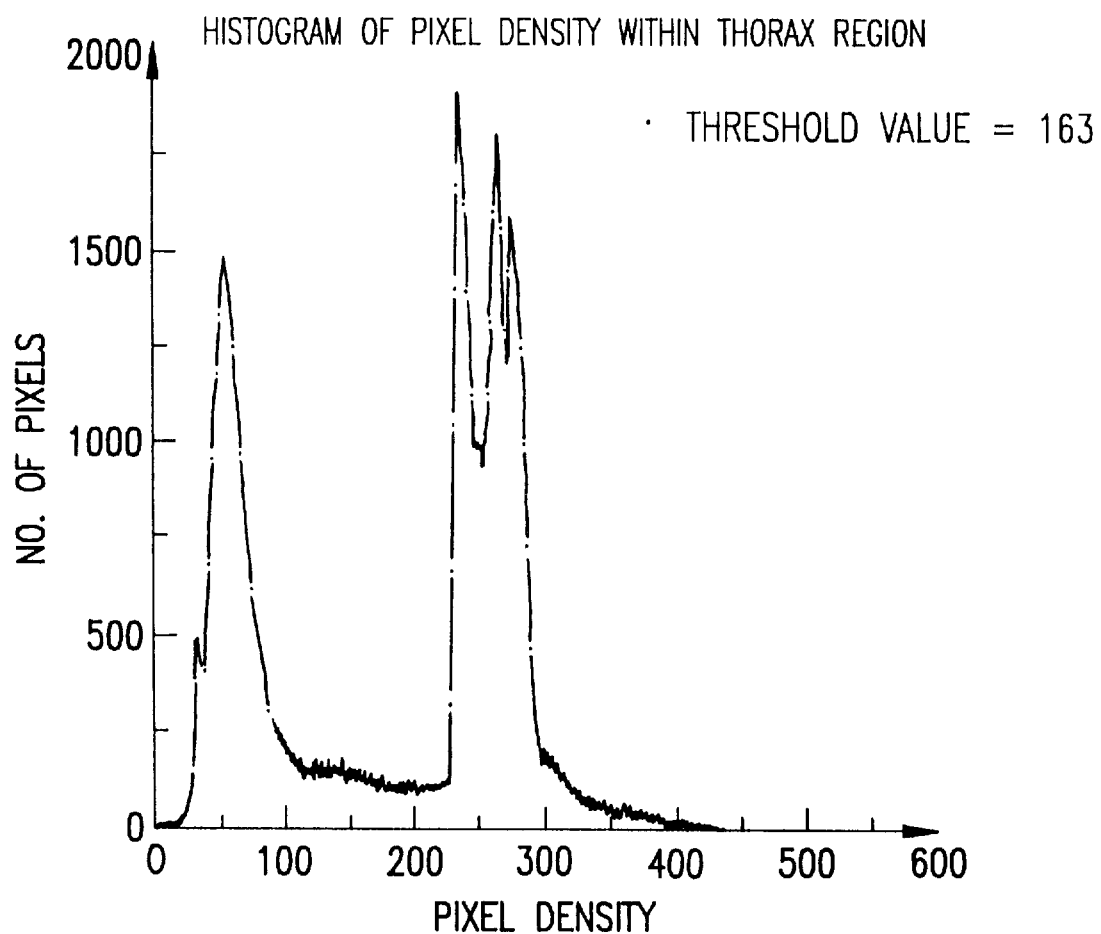
FIG. 7 is a graph showing the histogram of pixel density within the thorax region. Here, a threshold value of 163 was determined for use in segmenting the lungs within the thorax.

An actual gray-level histogram is shown in FIG. 7. The peak at lower pixel values corresponds to the aerated lungs while the peak at the higher pixel values corresponds the to the chest wall. Is should be noted that a pixel intensity convention chosen in this example where black corresponds to a value of zero. The opposite convention could also be used.

Figure 8:
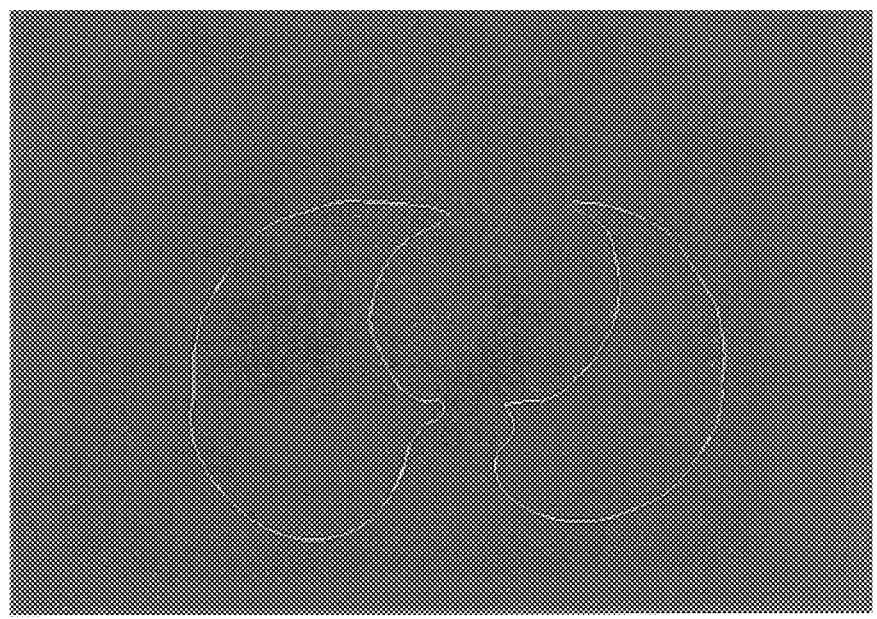
FIG. 8 is an illustration of the detected lung boundaries in a CT image of the thorax.

Using this gray-level threshold, a binary image is generated and boundaries of globally connected regions within the thorax region are delineated using an 8-point connectivity border tracker, in a similar manner as that described with regard to the thoracic boundary connection. Geometric constraints of location and size need to be satisfied. For example, the region must be located within the determined thoracic boundary and a compactness measure of greater than 10% was chosen. Detecting a region as located in the thoracic boundary can consist of requiring the entire region or the centroid of the region to be located in the thoracic boundary. This is determined by comparing the locations of the pixel of the region with the location of the pixels within the thoracic boundary. FIG. 8 shows the lung boundaries detected from the image in FIG. 5.

Figure 9A:
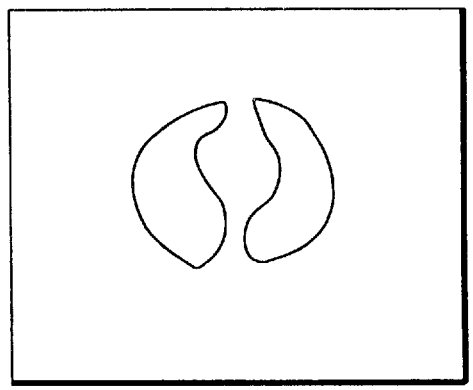
FIGS. 9A and 9B are schematic diagrams illustrating the automated method for the detection and extraction of features within the lung regions according to the invention.
Figure 9B:
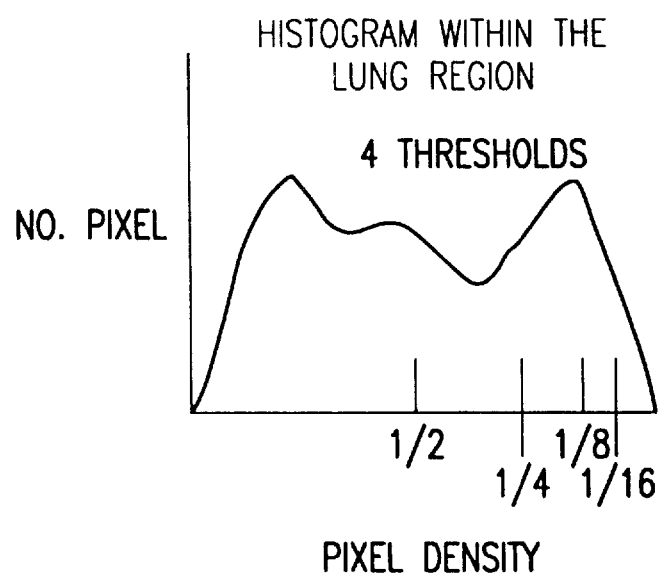

FIGS. 9A and 9B show schematic diagrams for the detection of features within the lung regions. Once the lung boundaries are determined, the features within the lung regions must be identified as nodules or vessels. This task is more difficult than the detection of the thoracic and lung boundaries since nodule boundaries may not be well separated from adjacent vessel boundaries. Thus, a single gray-level threshold is not sufficient to extract these features. Therefore, the gray-level thresholding is performed within the lung boundaries at a plurality of different thresholds. These threshold values are calculated from the gray-level histogram of the pixels within the lung boundaries. In this example, four thresholds corresponding to the pixel value at ½, ¼, ⅛ and ¹⁄₁₆ of the area under the histogram are selected for thresholding. Different values could also be chosen. At each of the four threshold levels a binary image is computed.

Figure 10A:
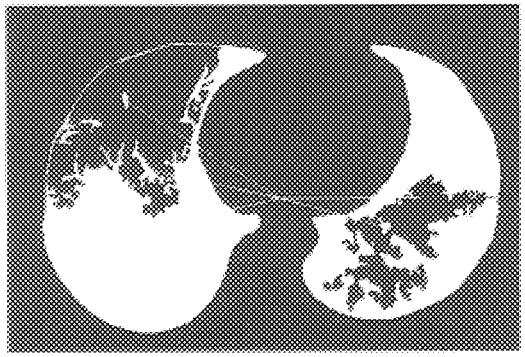
FIGS. 10A–10D are illustrations demonstrating resulting binary images obtained from the multi-gray level thresholding within the lung regions of the CT image of the thorax.
Figure 10B:
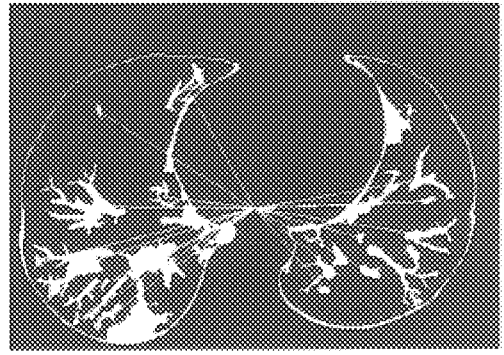
Figure 10C:
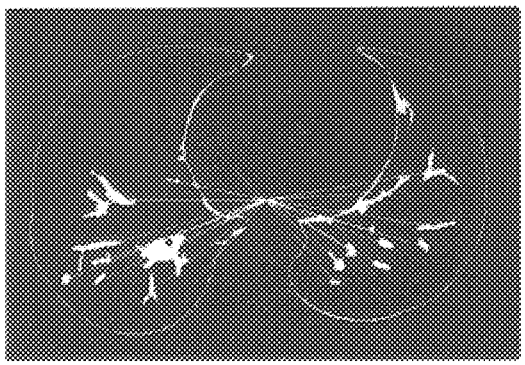
Figure 10D:
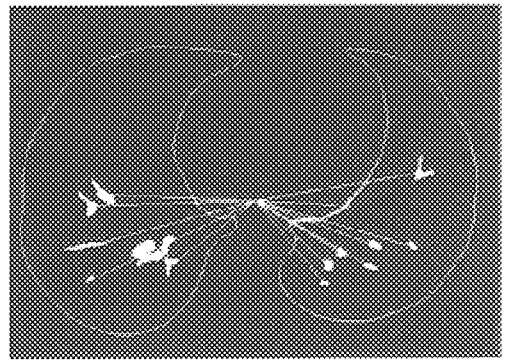

FIGS. 10A–10D show the four binary images obtained by thresholding the lung region of the CT image in FIG. 5 at the four different thresholds. Notice that when the threshold corresponds to ½ the area under the histogram (FIG. 10A), many of the features (white regions) are merged together. However, at the stricter threshold (corresponding to ¹⁄₁₆ of the area under the histogram; FIG. 10D), the features are quite small and separated. With each binary image, the boundary of each feature within the lung region is detected by the 8-point connectivity border tracking scheme.

Figure 11:
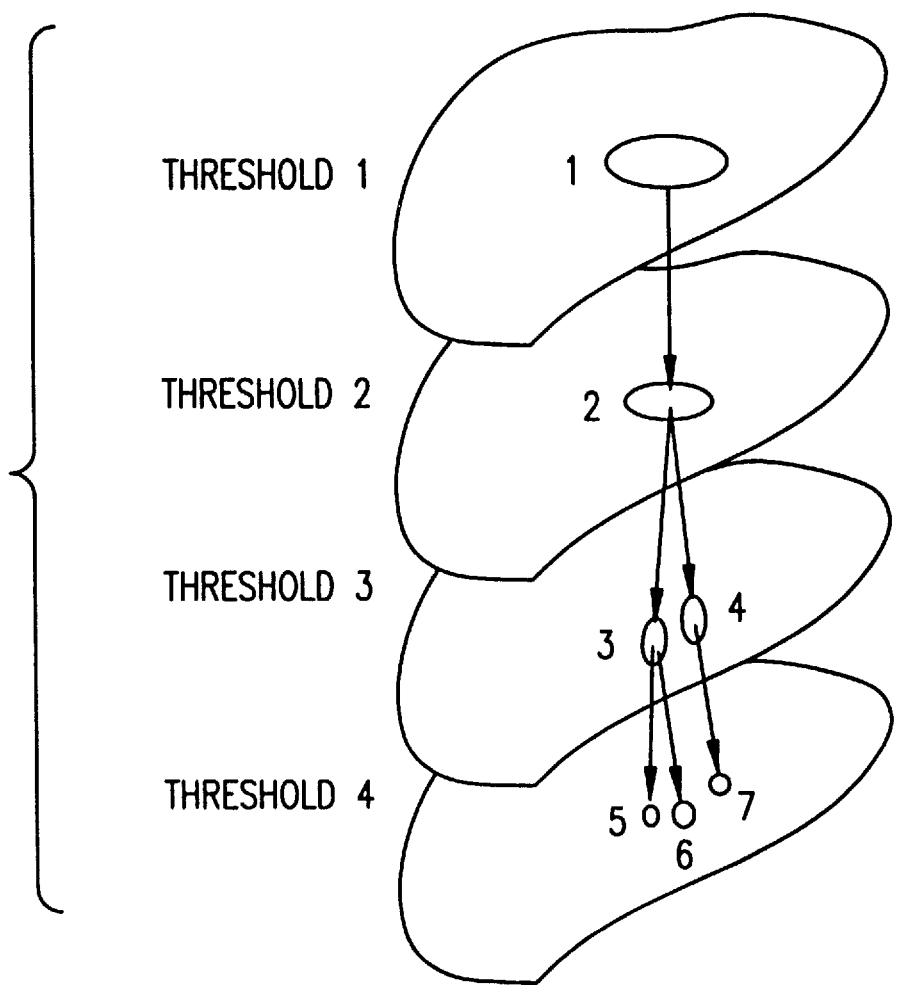
FIG. 11 is a schematic diagram illustrating the automated method for the correlation of features extracted at the multiple gray levels according to the invention.

The features at the various thresholds are related using a tree structure technique as illustrated in FIG. 11. Each feature in the tree structure is called a node. Node 1 is obtained from a feature detected at threshold 1 which is the lowest threshold (i.e., corresponding to ½ the area under the gray-level histogram of pixels within the lung region). Features detected at threshold 2 are examined if their centers lie within the boundaries of any features detected at threshold 1. In FIG. 11, the center of node 2 lies within the region of node 1. Thus, node 2 becomes the "Daughter Node" of node 1. As the gray-level threshold increases, some nodes may divide further and have multiple daughter nodes, while others may disappear and not produce further generations.

At each of the four gray-level thresholds the boundary of each feature of lung region in the CT section is detected. Seven geometric descriptors of each detected feature are then calculated. Table 1 lists the seven descriptors including perimeter, area, compactness, elongation measure, circularity, distance measure and total score.

TABLE 1

1. Perimeter = number of vertical or horizontal edges of pixels
2. Area = number of pixels − number of edges/2 + corner pixel correction
3. compactness = $\frac{area}{perimeter^2} \times 4\pi$ ($\geq 1$)
4. Elongation measure = $\frac{large\ eigenvalue}{small\ eigenvalue} = \frac{long\ axis}{short\ axis}$ ($\geq 1$)

TABLE 1-continued

5. Circularity = $\frac{compactness}{elongation\ measure}$ ($\geq 1$)
6. Distance measure = $\frac{distance\ from\ inner\ lung\ boundary}{distance\ from\ outer\ lung\ boundary}$
7. Total score = area × circularity × distance Using these geometric descriptors, each feature in the tree structure for a particular CT section is assigned a likelihood of being either a nodule or a vessel. A rule-based system was employed to distinguish features arising from nodules from those arising from vessels. Table 2 lists the possible classes to which detected features could be assigned.

TABLE 2

| Class | Designation |
|---|---|
| +5 | Definitely nodule |
| +4 | Probably nodule |
| +3 | Possibly nodule |
| +2 | Probably vessel |
| +1 | Definitely vessel |
| 0 | Undefined |
| −1 | Delete, defined in previous threshold level |

Within a particular CT section, once a feature is assigned to class +1 or class +5, its next generations in the tree structure do not need further analysis.

Figure 12A:
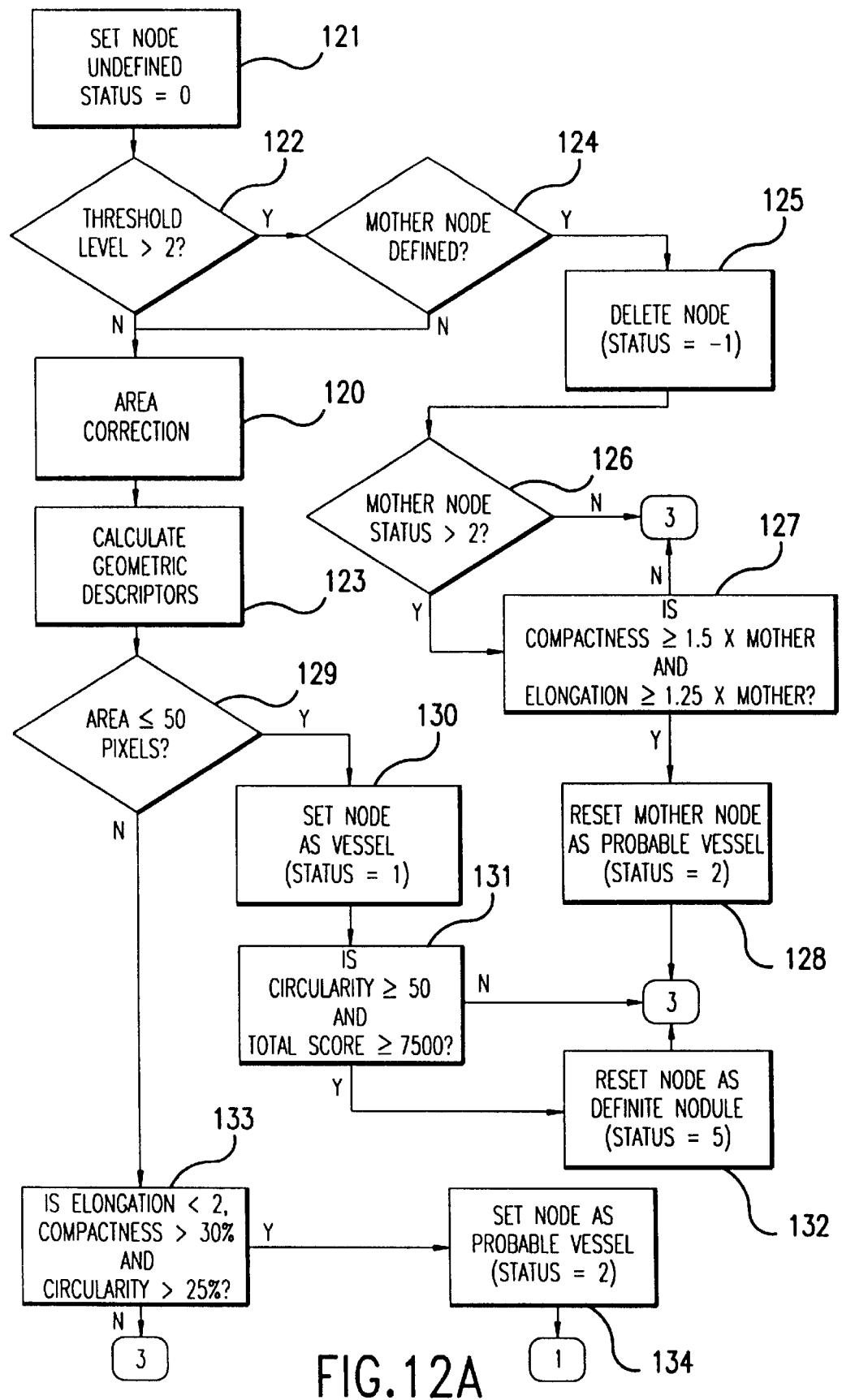
FIGS. 12A and 12B are a flow diagram of the rule-based scheme for feature analysis according to the invention.
Figure 12B:
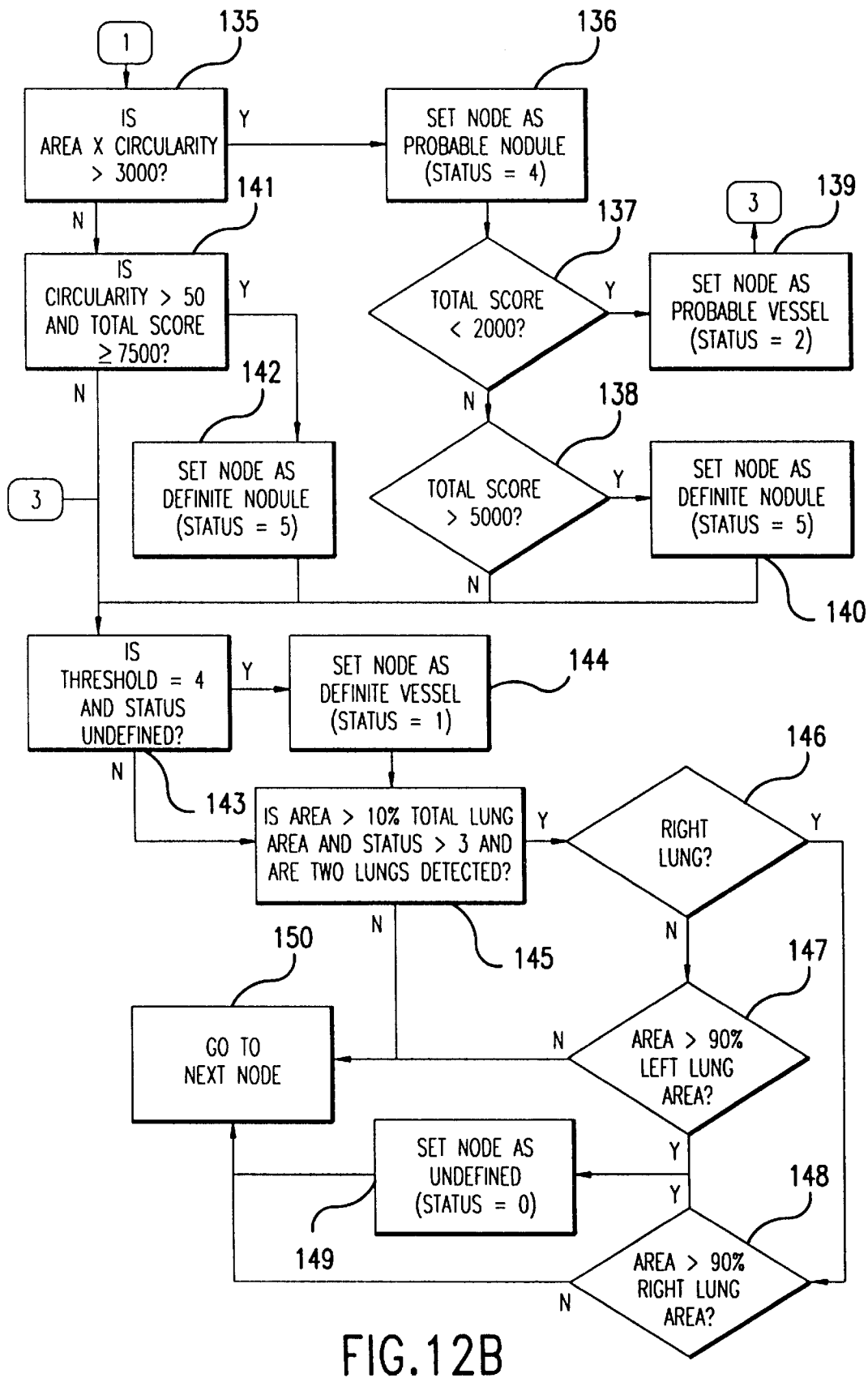
Figure 13:
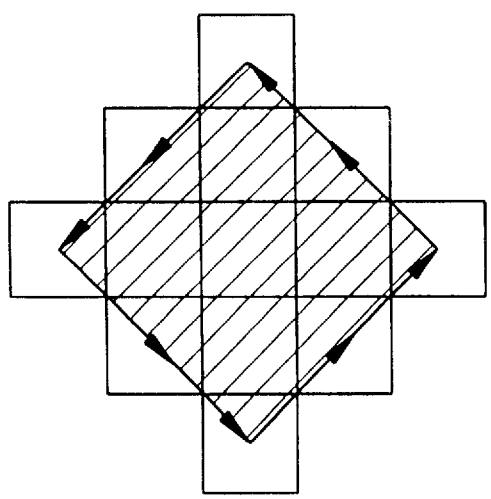
FIG. 13 is a diagram illustrating area and perimeter determination according to the invention.

FIGS. 12A and 12B show the rule-based system for classifying a feature according to the invention. A corner correction routine is performed on each feature (step 120). As discussed above, the area and perimeter of the detected features are calculated. In the case of large nodes, counting the pixels in the feature as its area and calculating the perimeter as the sum of all the non-shared sides provides a good measure of these parameters. However, when the features are small, the calculation of perimeter and area must be done carefully and a correction factor may be taken into consideration. Referring to FIG. 13, if the area is determined by counting the pixels and the perimeter is determined by summing the non-shared sides, values of area=13 and perimeter=20 are determined. In another approach, the detected boundary pixels can be taken as a set of points. Here, the shaded region enclosed by the dashed lines is taken as the detected node. In this case, area=8 and the perimeter=8√2.

This selection of the appropriate area and perimeter also has a great effect on the compactness. In the first instance, where the pixels are counted as the area, a compactness of 40.8% is calculated. On the other hand, taking the second approach a compactness of 78.5% is determined.

Figure 14:
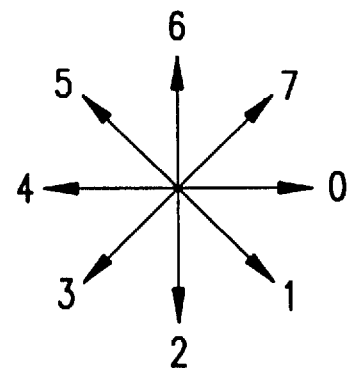
FIG. 14 is a diagram of a chain code.

In the embodiment an area correction based upon chain codes was used for all border detection (thorax, lungs and features). A chain code is shown in FIG. 14 and indicates all eight possibilities for the next pixel of the border for any given border pixel. That is, if a pixel is considered to be at the center of the chain code, the chain codes indicate which direction the next pixel on the border is located. Here the perimeter and area are determined as perimeter=(number of (0,2,4,6) chain codes+number of (1,3,5,7) chain codes)×(√2)

area=total number of pixels in a feature—½(total number of chain codes)+corner correction term The subtraction of ½ of the chain codes results in each boundary pixel contributing ½ of its area to the total area of the feature.

Figure 15A:
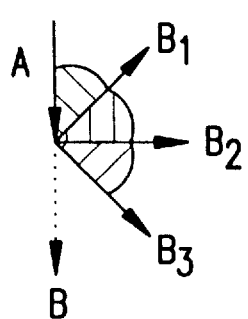
FIGS. 15A and 15B are diagrams illustrating corner correction according to the invention.
Figure 15B:
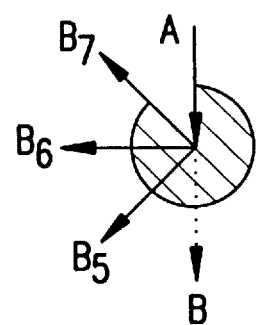

FIGS. 15A and 15B illustrate the corner correction according to the invention. For the purposes of explanation it is assumed that the detected area of the feature is in the right side of the chain codes (designated as A in FIG. 15A). The next border pixel can be in any of the chain codes B1–B7. In FIG. 15A, a turn in the border toward the inside of the feature, i.e. one that reduces the area the feature is illustrated. Here, the feature is on the right side of the chain code and the present pixel is again designated as A. For the shown chain codes B1–B4, the following reductions in pixel area are taken:

B1—reduce area of pixel by ⅜

B2—reduce area of pixel by ⅔

B3—reduce area of pixel by ⅛

B4—no reduction

Here, the B4 direction indicates no corner (the border continues in the direction of A) so no reduction is taken.

FIG. 15B illustrates a corner turn where the area of the feature is expanded. Using the same conventions as described for FIG. 15B the following expansions are taken:

B7—expand area of pixel by ⅜

B6—expand area of pixel by ⅔

B5—expand area of pixel by ⅛

B4—no expansion

The chain codes B1–B7 correspond to the following value directions: B1=5, B2=6, B3=7, B4=0, B5=1, B6=2 and B7=3. The corner correction term is thus the sum of Bi-A over the boundary and is given as:

$$\Sigma(Bi-A)/8$$

where: A is the initial direction, and
Bi is the direction obtained by going to the next pixel in the chain code.

It should be pointed out that A has a value direction of 8, which is evident from FIGS. 15A–15C.

In a practical sense, the corner correction term tends to be negligible as the size of objects and the irregular shapes tend to cause the expansion and reduction to offset one another.

Referring back to FIG. 12A the status of the current node under analysis is initially set to "undefined" (status=0) in step 121. Next, in step 122 it is determined whether the threshold level is at least the second threshold. In the case where the first threshold is being analyzed the process proceeds to step 123 where the geometric descriptors (given in Table 1) are determined. Where a threshold level other than the first threshold level is being analyzed, it is determined whether the mother node of the current node is defined in step 124. If the mother node is defined, i.e. has a class of 1–5, the current node is deleted by setting the status=−1 (step 125).

After deleting the node, the trend of the current node compared to its mother node is checked. In step 126, if a mother node is a definite vessel (status=1) the process proceeds to step 143 (FIG. 12B at "3"). For all mother nodes having a class greater than 2 (step 126), the compactness and elongation are determined for the current node and checked against that of the mother node (step 127). This is performed by calculating the geometric descriptors for the current node and checking the compactness and elongation against that of the mother node. If the compactness is greater than 1.5 times that of the mother node and the elongation is at least 1.25 times that of the mother node, the mother node status is reset to "possible vessel" (status=2) in step 128.

If in step 122 the mother node is not defined, the area, compactness, circularity, elongation and total score are calculated for the current node (step 123). Next, in step 129, the area descriptor is evaluated. If the area of the current node is no more than 50 pixels, the current node is classified as a vessel, setting status=1 (step 130).

Nodules often have small area (FIG. 16A) and thus further analysis should be carried out. The circularity and total score are then checked in step 131, and if the circularity≧50% and the total score≧7500, the current node is classified as a nodule, setting status=5 (step 132).

If the area of the current node is determined to be more than 50 pixels, the current node is checked to see if its shape is close to being circular. The measures of elongation, compactness and circularity are evaluated. In particular, it is determined whether the elongation<2, compactness>30% and circularity>25% (step 133). If these three criteria are met, the node is classified as a probable vessel, setting status=2, in step 134.

The process then proceeds to step 135 where the area score, which is the product of the product of the area and the circularity is calculated. This is performed to distinguish a nodule from a circular vessel cross section. If this product >3000 (step 135), the current node is classified as a probable nodule (status=4) in step 136. The total score is then evaluated (steps 137 and 138). The node is classified as a probable vessel if the total score<2000 and the status is reset as a probable vessel in step 139. This is apparent from FIG. 16F as most vessels have a low total score. If the total score is over 5000, the current node is classified as a definite nodule (step 140).

A last check is done for nodules which are rather small and have a high circularity. In step 141, the circularity and total score are checked. If the circularity≧50% and the total score>7500, the current node is determined to be a nodule, setting status=5 in step 142.

If the result of the determination in the step 141 is negative, or a previous step proceeded to "3" a check is mode to determine if the current node is undefined and the last threshold is reached (step 143). If this is the case, the status of the current node is set to definite vessel in step 144. Step 145 has been included to guard against the lung being classified as a big nodule. The lung area is calculated as described above for the features and compared with the current node. Also, the status of the node must be greater than 3 and two lungs must have been detected.

Next, whether the current node is in the right or left lung is determined (steps 146) and the area of the node is compared against the lung area (steps 147 and 148). If the current node area is greater than 90% of either lung area, the status is set to undefined in step 149. The analysis of the current is completed and the next node is analyzed, beginning the process anew. This is repeated until all nodes detected at each of the four thresholds have been analyzed (step 150).

The result of the rule-based scheme is an analyzed CT scan having all identified features from the four threshold levels. Note that many nodes are deleted when the mother node has already been defined (step 124).

Figure 16A:
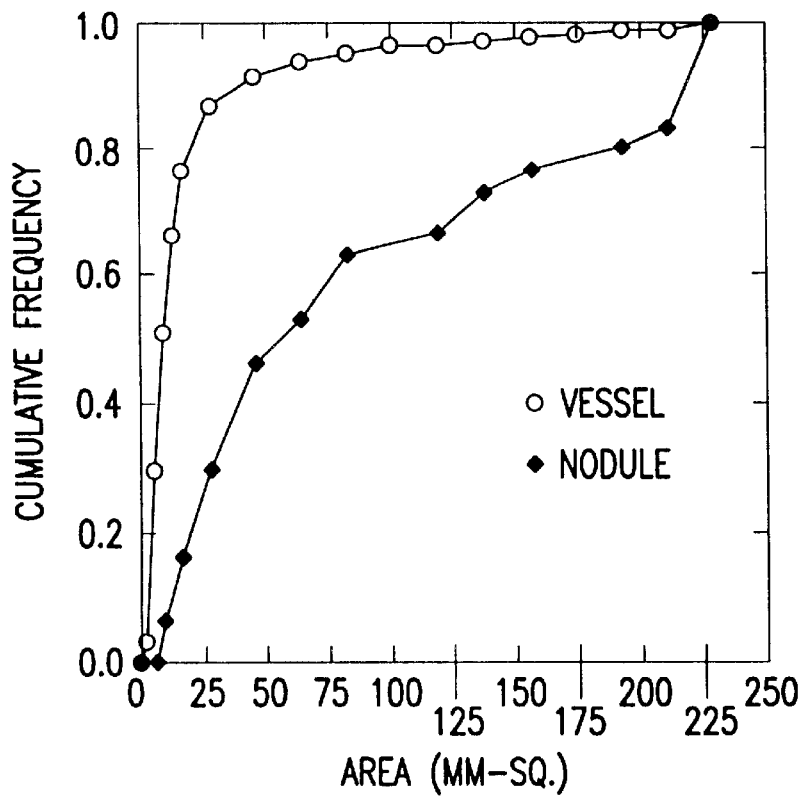
FIGS. 16A–16F are graphs illustrating the cumulative distributions of the geometric descriptors for nodules and blood vessels: (a) area, (b) percent compactness, (c) elongation measure, (d) percent circularity, (e) distance measure, and (f) total score.
Figure 16B:
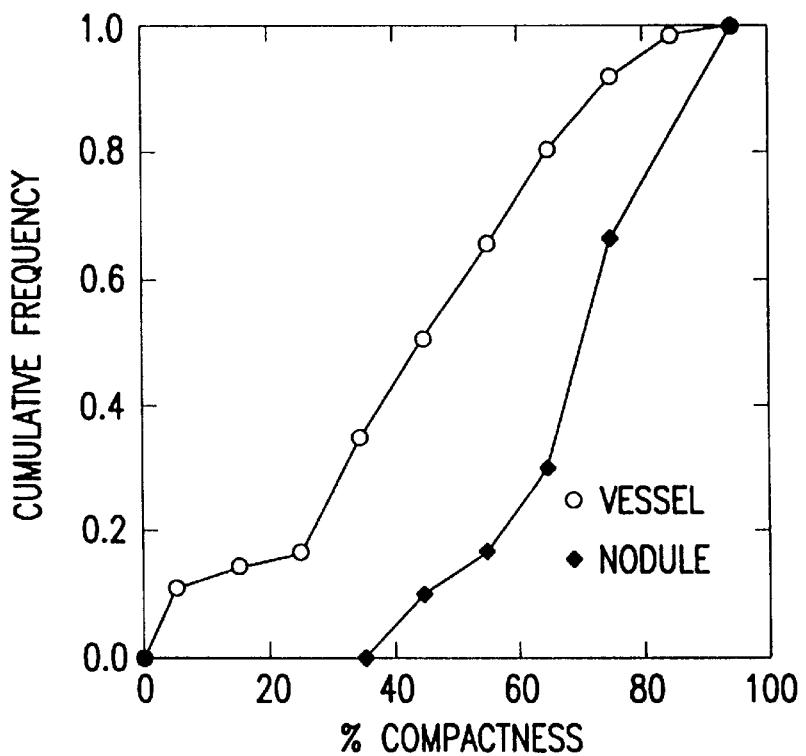
Figure 16C:
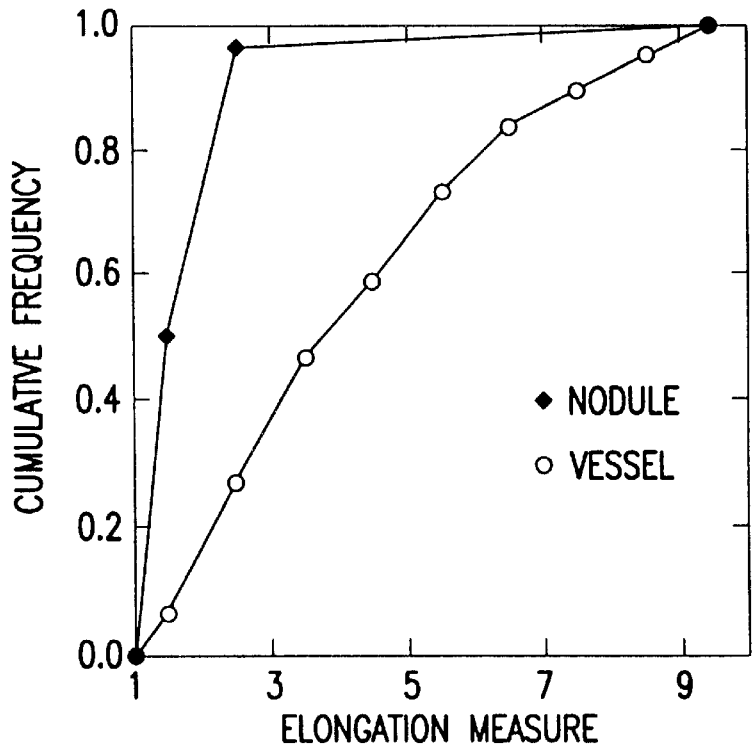
Figure 16D:
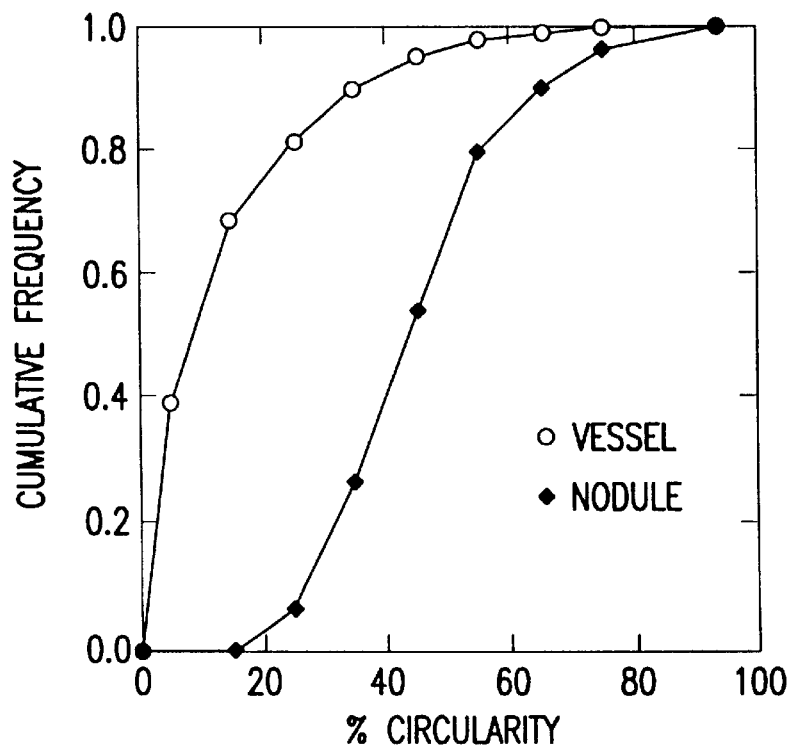
Figure 16E:
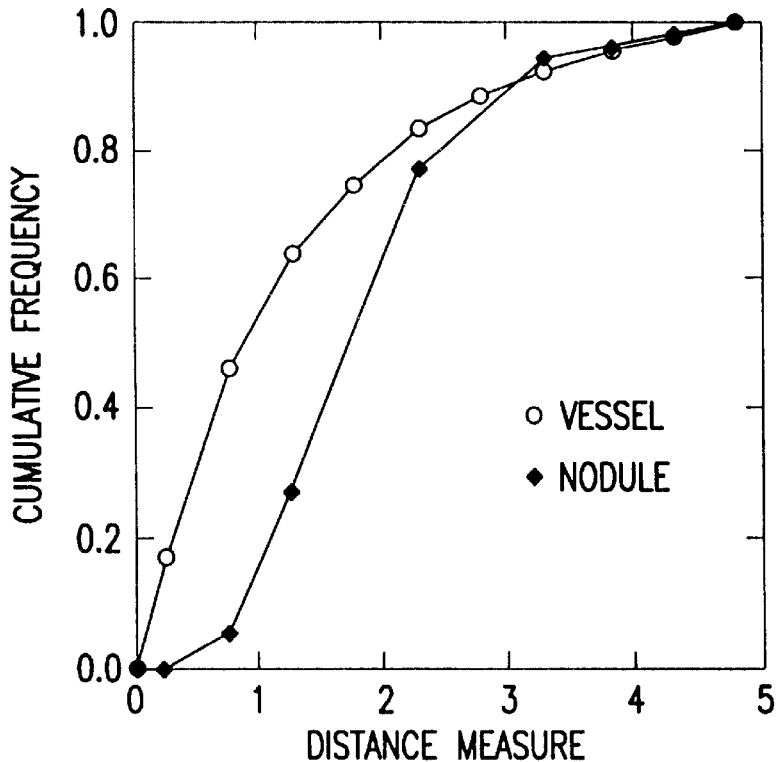
Figure 16F:
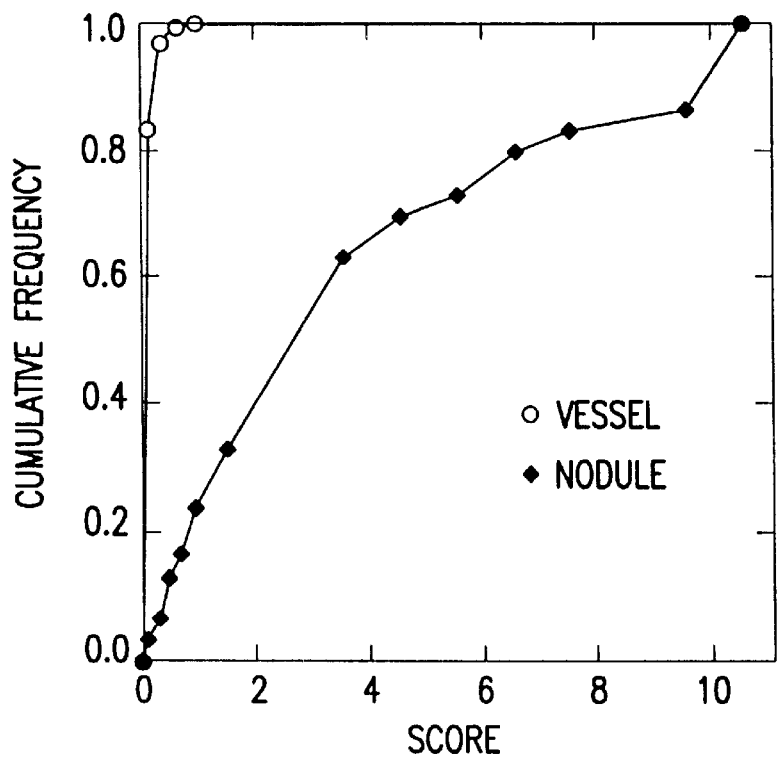

As indicated above, the decision rules were determined from the analysis of cumulative distributions of the various geometric descriptors for both nodules and vessels as identified by chest radiologists in sample cases. These cumulative frequencies are prepared by an experienced radiologist who identifies nodules and other features in the CT scan. FIGS. 16A–16F illustrate the distributions of six descriptors for nodules and vessels. Notice, that by choosing an appropriate cutoff value for a particular descriptor, a certain percentage of features arising from vessels can be eliminated. For example, no nodules were found to have a compactness score of less than about 35% (FIG. 16B). All nodes have a compactness less than this value are a vessel and can be eliminated. The abscissa of FIGS. 16D, 16E and 16F are shown in relative scale, but illustrate the principle that the cumulative frequencies can be used to separate nodules from vessels in CT scans.

A multiplicative combination of all the geometric descriptors (total score) was only used when a feature could not be classified by the other rules. The total score is passed through a cutoff threshold (see FIG. 12B).

Each feature in the tree structure from a particular CT section was thus examined in terms of its size, elongation factor, compactness and circularity. Features with a very small area were deleted (FIG. 16A). Features with a large area but low circularity were categorized as "undefined" and assigned a likelihood rating of 0, indicating that further analysis was needed in next generations in the tree structure.

Features with high circularity can either arise from nodules or from vessels that lie perpendicular to the scan plane. However, if circular features are located peripherally (use of distance measure) or if they are too big to be vessels (use of size measure), they were considered to be nodules.

The descriptors of each feature were also compared with those of its further generations in the tree structure. In general, features arising from nodules tend to maintain a high degree of circularity over a larger range of gray-level thresholds than do vessels. Vessels, found in circular cross section in one CT scan, will eventually turn and lose circularity in other CT scans.

It should be pointed out the above rule-based system is an example only. Other systems could be used and the invention is not limited to the exact values of the geometric descriptors discussed. As is evident from FIGS. 16A–16F other descriptor cutoff values could be chosen and effectively detect nodules in a CT scan. It is also apparent that a neural network trained to distinguish nodules from vessels could also be used.

Other rule-based systems could be used and the invention is not limited to the exact values of the geometric descriptors discussed. As is evident from FIGS. 16A–16F other descriptor cutoff values could be chosen and effectively detect nodules in a CT scan. It is also apparent that a neural network trained to distinguish nodules from vessels could also be used.

Figure 17:
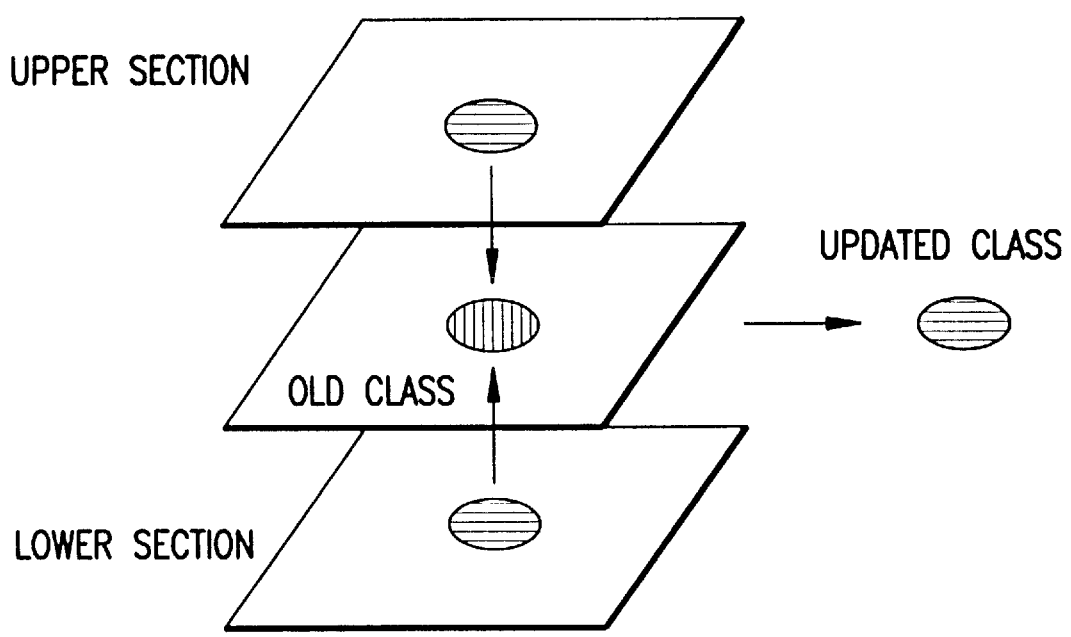
FIG. 17 is a schematic diagram illustrating the process for updating the classification rating of a feature in one CT section by comparison with adjacent sections according to the invention.

FIG. 17 shows a schematic diagram for the comparison of features between CT sections. Although nodules and vessels are three dimensional, the initial classification is performed on individual 2-dimensional CT sections. As described earlier, for each CT section, a tree structure is generated from four binary images of features within the lung region. Each feature in the tree structure is then assigned a likelihood of being either a nodule or vessel. However, in some cases, ambiguous features (classes of 2, 3, or 4) may remain. These ambiguities can be resolved by comparing features in adjacent CT sections. When a nodule or vessel is imaged in more than one section, the resulting features (from multiple sections) may be assigned to different classes in different sections.

In the method according to the invention, a feature with a weakly-defined classification (i.e., 2, 3 or 4) will be upgraded to a more definitely defined class if such class exists in an adjacent section. Each CT section is compared with the section above and below (except for the end sections or if less than three sections are taken) as nodules typically are not present in many sections while a vessel could be quite long as be present in several sections.

Figure 18:
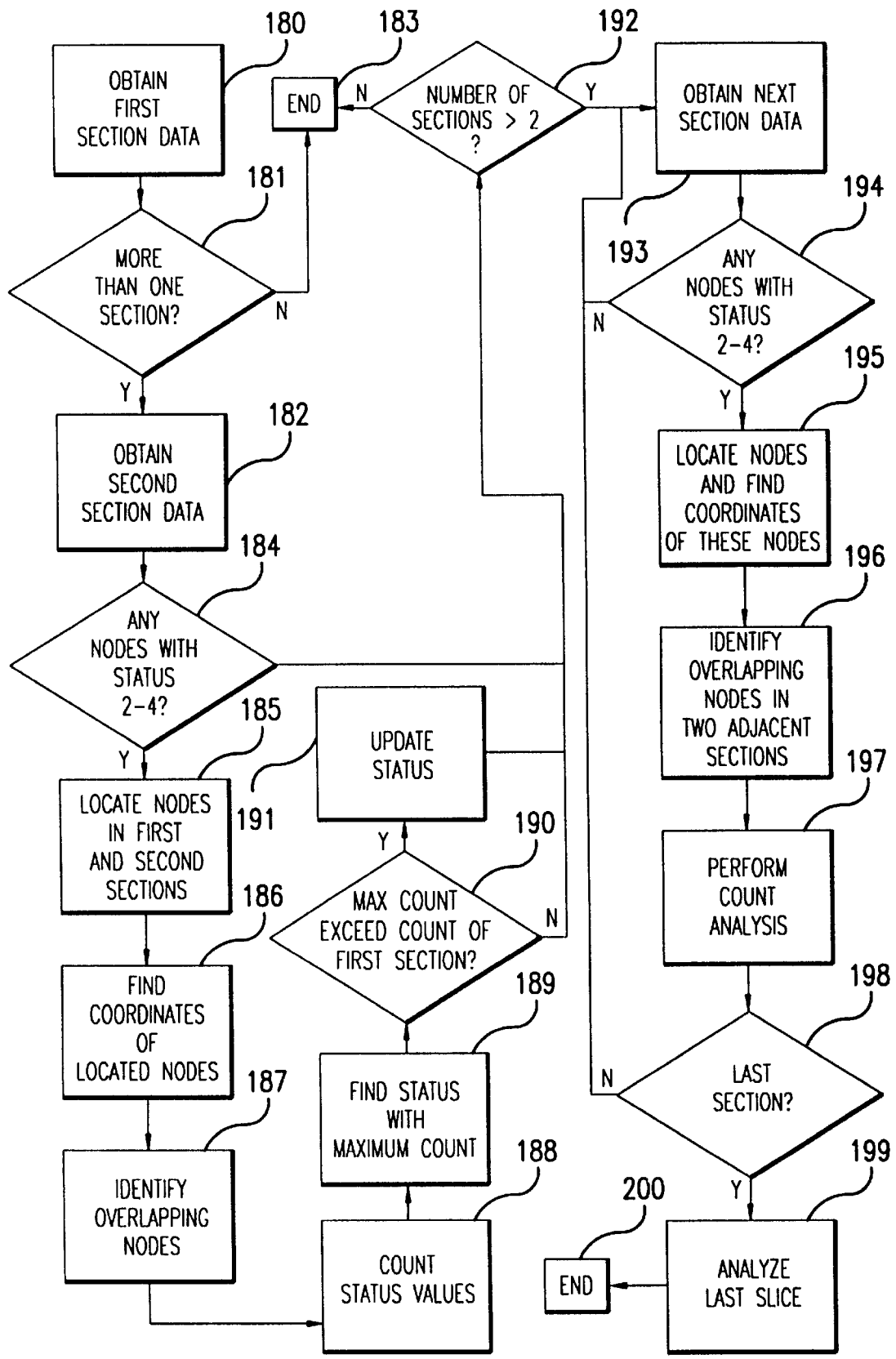
FIG. 18 is a flow chart illustrating the process for updating the classification rating of a feature in one CT section by comparison with adjacent sections according to the invention.

The process for comparing CT sections and updating the classification is shown in FIG. 18. If there are any nodes having a status of 2, 3 or 4, that is, a status other than definitely defined status, then section comparing is necessary. The sections compared are the analyzed sections obtained via the rule-based system. The first section is obtained in step 180, and a check is made to see whether only one CT section exists in step 181, as then no comparison is necessary and the comparison ends (step 183). If there is more than one section, the second section data is obtained (step 182) and a check is made to determine whether any nodules exist having a status 2–4 in the first section (step 184). This information has been determined during the feature analysis using the rule-based scheme.

It is then determined in step 185 whether there are any nodes in the first section having a status=2–4. If the answer is positive nodes having a status=2–4 are located in the first section and nodes having a status=3–5 are located in the second section.

For the first section, all nodes are located having a status of 2–4. The pixel locations for each of the located nodes are recorded in step 186, resulting in a set of x-y coordinates for each of the pixels of the located nodes. The x-y coordinate information is also available from the analysis made during the rule-based scheme, since boundaries and other geometric parameters of the nodes have been calculated. Next, the second section is examined and the located nodes of the second section which overlap each node in the first section are identified (step 187). For each node in the first section, a tabulation is made by status of the number of pixels in all nodes having a status=3–5 which overlap that node (step 188). The status having the maximum number of counts (number of pixels) is determined in step 189. If the count of the status having the maximum number of counts exceeds the count (number of pixels) of the corresponding node in the first section, the status of the node in the first section is updated to that of the node having the maximum status count in the second section (steps 190 and 191).

Next, a check is made in step 192 to determine whether the number of sections is greater than 2. If not, the procedure ends (step 183). If there are more than two sections, the data is obtained for the next section in step 193. A check is made in step 194 if there are any nodes having a status=2–4 in the second section. If there are none, the data for the next section (third) is obtained and step 194 is repeated. This procedure eliminates from the comparison those sections having no nodes with a status=2–4.

If the second section has nodes with a status=2–4, the coordinates of the pixels of located nodes are found in the second section and the coordinates of nodes having a status=3–5 are found in the third (step 195).

The overlapping nodes are identified in both the first and third sections (one above and one below the reference section) in step 196. The count analysis described with regard to steps 188–191 is repeated for the identified overlapping nodes in the two adjacent sections (step 197). A check is made in step 198 to determine whether the last section has been reached as one of the reference sections used to compare with another section. If the last section has not been reached, the process returns to step 193, thereby repeating the analysis for all the sections excluding the last section. When the last section is reached, it is analyzed with respect to only the preceding section in the same manner as described above, that is, overlapping nodes are identified and status values are counted and compared (step 199). The process then terminates (step 200).

Figure 21:
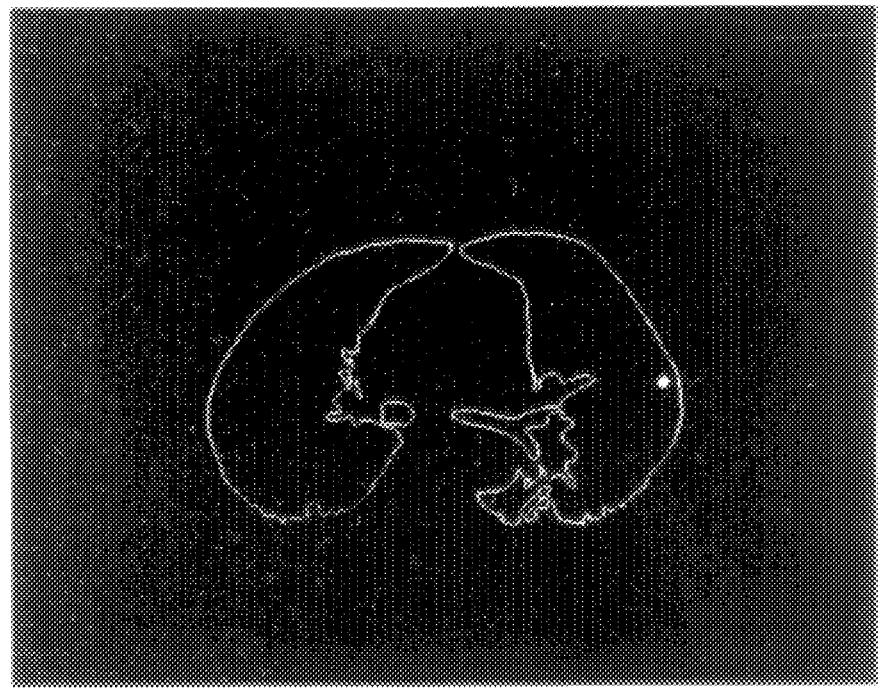
FIG. 21 is an illustration demonstrating the detection of a small nodule in a CT section.

After the comparisons have been completed, the nodes in each section having a classification of 4 or 5 are kept. The section then can be displayed in three dimensions with the nodes having the status of 4 or 5, as shown in FIG. 21.

Figure 19A:
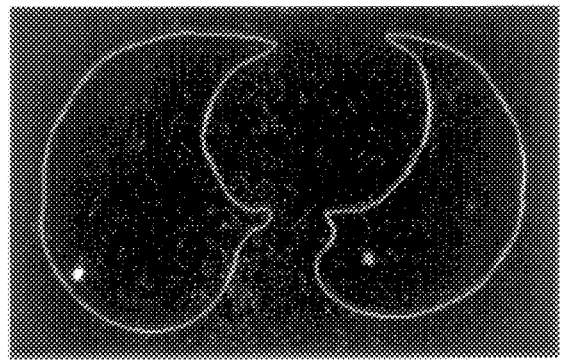
FIGS. 19A and 19B are illustrations demonstrating the detection of small nodules in two adjacent CT sections.

The usefulness of this section comparison is demonstrated in FIG. 19A and l9B which show an example case in which a nodule in one section is detected only after its corresponding feature is compared with a "definitely" defined nodule in an adjacent section. Examining continuity of a structure in adjacent sections is especially important in detecting vessels lying perpendicular to the scan plane.

Table 3 illustrates the detection performance of the method for thoracic CT scans of 8 patients with pulmonary nodules who were examined.

TABLE 3

Detection results for the eight clinical cases.

| Case No. | No. of Sections | Actual Nodules | Nodules Detected | False Positives |
| --- | --- | --- | --- | --- |
| 1 | 29 | 21 | 19 | 0 |
| 2 | 25 | 4 | 4 | 1 |
| 3 | 20 | 2 | 2 | 0 |
| 4 | 25 | 6 | 4 | 2 |
| 5 | 20 | 5 | 4 | 2 |
| 6 | 25 | 6 | 6 | 1 |
| 7 | 22 | 2 | 2 | 0 |
| 8 | 25 | 2 | 2 | 4 |

Cases were selected based on the presence of one or more unequivocal nodules, and the absence of other pulmonary abnormalities. The number of nodules ranged from 2 to 21 per case, and the size of the nodules ranged from 3 to 18 mm in terms of effective diameter. The number of CT sections per case ranged from 20 to 29. Locations of nodules were identified by an experienced chest radiologist. Each scan section was 10 mm thick with pixel values ranging from 0.66 mm to 0.94 mm. Table 3 also lists the number of true-positive detections and false-positive detections per case. In this tabulation, features given a final classification of 4 or 5 were counted as detected nodules. The computer detected 94% of the actual nodules with an average of 1.25 false-positive detections per case.

It should be noted that once CT sections are obtained, the thorax, lung boundaries and nodule detection processes are totally automated. After the locations of suspected lesions are found, the detection results can be presented to a radiologist or serve as an input to a 3-dimensional display system.

Figure 19B:
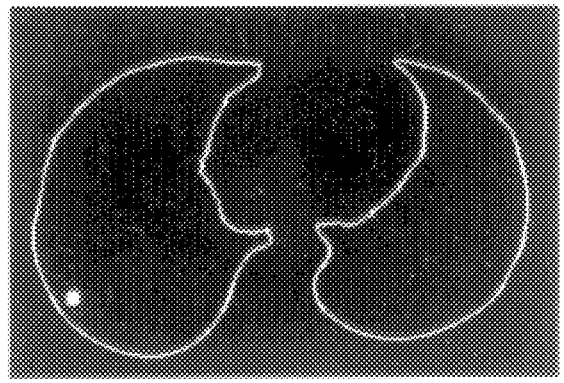
Figure 20:
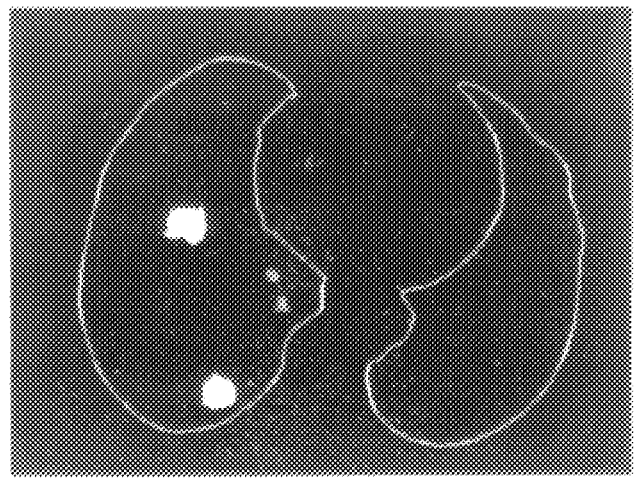
FIG. 20 is an illustration demonstrating the detection of two large nodules in a CT section.

FIGS. 19–21 demonstrate the performance of the method according to the invention on CT sections from three of the cases. Here the features that were classified as "definite" nodules are shown in white, and those that were classified as "probable" vessels are shown in gray. FIGS. 19A and 19B show two adjacent sections. Note that the small nodule in the right lung is faintly visible due to being only partially included in the section in FIG. 19A. The nodule was correctly detected in both sections. A vessel in the left lung was detected and indicated as a vessel in FIG. 19B.

FIG. 20 demonstrates the performance of the method for large nodules and shows a section with two nodules in the right lung. The posterior nodule had initially been classified as ambiguous in the single section analysis of an adjacent section. However, after the analysis of the section shown, in which a "definite" nodule had been found, the feature in the previous section was updated to a "definitely nodule". The two gray features correctly indicate vessels.

FIG. 21 illustrates the performance of the method for detecting small nodules. The small nodule in the left lung region was correctly identified with no possible vessels.

Figure 22A:
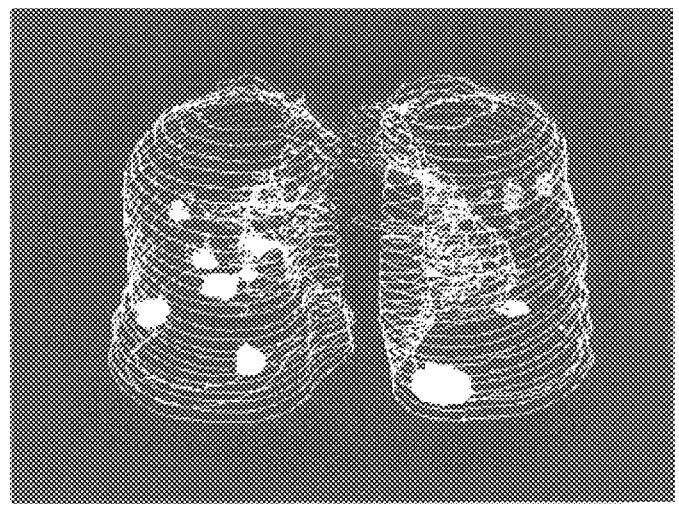
FIGS. 22A and 22B are illustrations of a possible three-dimensional display of detected nodules using lung contours in a wire-frame representation at two rotations.
Figure 22B:
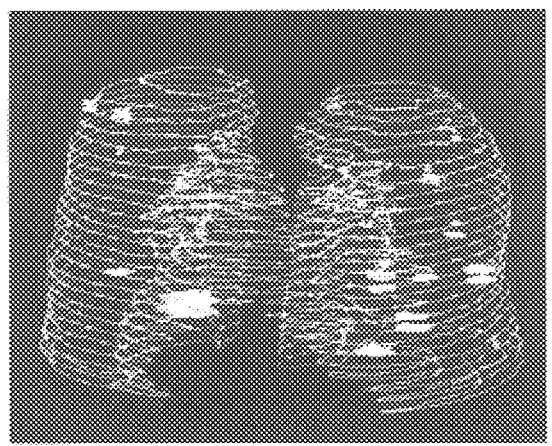

FIGS. 22A AND 22B show wire-frame representations of detected nodules within a set of lung contours displayed at two different rotations. Although this is a rather crude three-dimensional representation, it serves to illustrate the potential of the computerized detection scheme. Three-dimensional displays generated by these techniques may be useful in planning surgical resections or for calculating radiation doses for therapeutic purposes.

Figure 23:
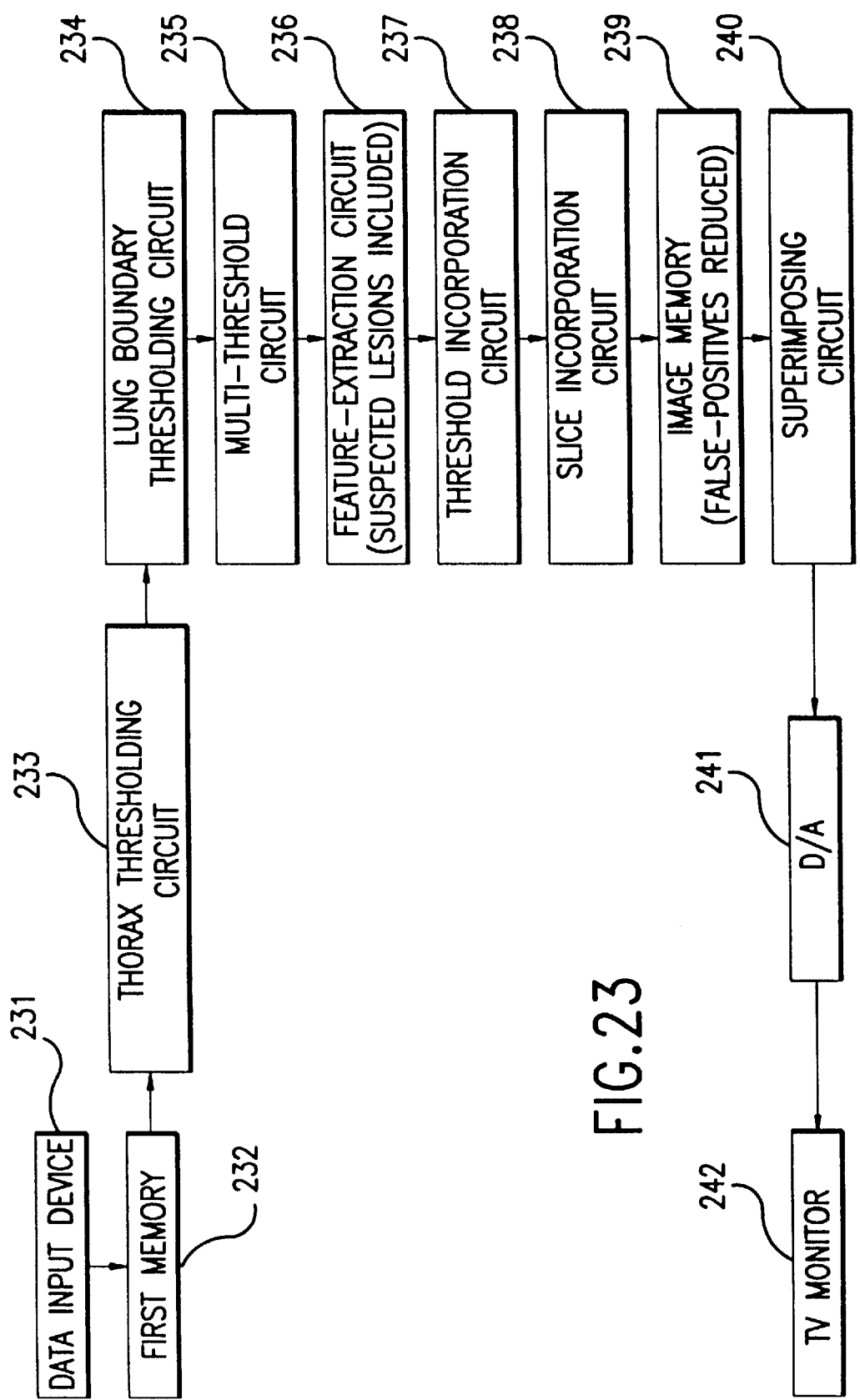
FIG. 23 is a schematic block diagram illustrating a system for implementing the automated method for the detection of lesions in CT images of the thorax.

FIG. 23 is a more detailed schematic block diagram illustrating a system for implementing the method of the invention. Referring to FIG. 18, CT images of an object are obtained from an image acquisition device 231 and input to the system. The image acquisition can be, for example, a laser scanner such as a GE 9800 scanner. Each cross-sectional section is put into memory 232. The thorax is segmented in the thorax thresholding circuit 233. The data is passed to the lung boundary thresholding circuit 234 in order to determine the boundary of each lung region. Image data within each lung region, is passed to the multi-thresholding circuit 235 in order to determine the multiple binary images for each section and which are then combined in the feature extract circuit 236 and the threshold incorporation circuit 237 to locate suspicious lesions. Comparison between CT sections is done in the section incorporation circuit 238. During the incorporation of the multi-threshold images and the adjacent sections, the data is retained in image memory and features are analyzed to reduce false-positive detections 239. In the superimposing circuit 240 the results are either superimposed onto CT image sections or shown in 3-dimensional format. The results are then displayed on the display system 242 after passing through a digital to analog convertor 241.

The devices 1002–1006 can be implemented by a programmed computer using software to carry out the various feature analyses.

Obviously, numerous modifications and variations of the present invention are possible in light of the above technique. It is therefore to be understood that within the scope of the appended claims, the invention may be practiced otherwise than as specifically described herein. Although the present application is focussed on pulmonary nodules, the concept can be expanded to the detection of local abnormalities in other organs in the human body, or anatomic regions of the human body. For example, the concepts of the invention can be applied to the detection of a different anatomic feature in CT scans, where its border can be delineated. The multi-gray-level thresholding can then be applied to suspected lesions in the anatomic feature. A tree structure of the nodes corresponding to the suspected lesions can be formed, the nodes analyzed, and adjacent CT scans can be analyzed. A rule-based analysis can be derived from obtaining cumulative frequencies of parameters of the lesions in the anatomic feature similar to that described in connection with FIGS. 16A–16F. The invention is thus of broad application and not limited to the specifically disclosed embodiment.

What is claimed as new and desired to be secured by Letters Patent of the United State is:

1. A method for the automated detection of nodules in a computed tomographic (CT) scan of a subject, comprising:
   detecting an anatomic region of said subject in said CT scan; and
   detecting a nodule in said anatomic region using a plurality of images of said anatomic region in said CT scan generated at different section-specific gray-level thresholds.

2. A method as recited in claim 1, wherein said step of detecting said anatomic region comprises:

forming a histogram of gray-values of pixels in said CT scan;

determining a gray-level threshold using said histogram; and generating a binary image of said anatomic region using said gray level threshold.

3. A method as recited in claim 2, comprising:

forming a histogram of gray-values of pixels in said CT scan from a corner of said CT scan to a center of said scan;

wherein said step of selecting said gray level threshold comprises:

determining a first cumulative mean of said histogram from said corner to said center of said CT scan;

determining a second cumulative mean of said histogram from said center to said corner of said CT scan;

determining a difference between said first and second cumulative means; and using said difference to determine said gray-level threshold.

4. A method as recited in claim 2, wherein said step of detecting said anatomic region further comprises:

detecting a boundary of said binary image; and evaluating geometric parameters of a region enclosed by said boundary.

5. A method as recited in claim 4, wherein said step of detecting a boundary comprises detecting a thoracic boundary.

6. A method as recited in claim 4, wherein:

said step of detecting said boundary of said binary image comprises using 8-point connectivity; and said step of evaluating geometric parameters comprises evaluating a size and a compactness of said region.

7. A method as recited in claim 6, wherein said step of evaluating geometric parameters further comprises:

requiring said size of said region to be at least a predetermined portion of a size of said CT scan and requiring said compactness of said region to be at least a predetermined value in order for said region to be detected as said anatomic region.

8. A method as recited in claim 2, comprising:

detecting a boundary in said binary image;

forming a second gray-level histogram of pixels within said boundary;

determining a gray-level threshold based on said histogram;

generating a second binary image using said second gray-level threshold.

9. A method as recited in claim 8, comprising:

detecting a second boundary in said second binary image; and evaluating geometric parameters of a region enclosed by said second boundary.

10. A method as recited in claim 9, wherein said step of evaluating geometric parameters comprises:

determining an area of said region; and correcting said area using a corner correction technique.

11. A method as recited in claim 9, wherein said step of evaluating geometric parameters comprises:

requiring said region to be located in said first boundary and requiring a compactness of said region to be at least a predetermined value in order for said region to be detected as said anatomic region.

12. A method as recited in claim 11, wherein:

detecting said first boundary comprises detecting a thoracic boundary; and said region is a lung.

13. A method as recited in claim 1, further comprising:

detecting features in said anatomic region as suspected nodules using said plurality of images;

determining geometric descriptors for selected ones of said features; and detecting said nodule using said geometric descriptors.

14. A method as recited in claim 13, wherein said step of determining geometric descriptors comprises:

determining plural of perimeter, area, compactness, elongation, circularity, distance measure and total score for said selected ones of said features.

15. A method as recited in claim 13, wherein said step of detecting said nodule using said geometric descriptors comprises assigning each of said features a likelihood of being a nodule.

16. A method as recited in claim 15, wherein:

said anatomic region is a lung pair; and said step of detecting said nodule using said geometric descriptors comprises assigning each of said features a likelihood of being a nodule or a vessel.

17. A method as recited in claim 1, further comprising:

detecting features in said anatomic region as suspected nodules using said plurality of images; and performing a corner correction routine on selected ones of said features.

18. A method as recited in claim 17, wherein performing said corner correction routine comprises:

detecting a boundary of each of said selected ones of said features;

determining chain codes for pixels on said boundary of each of said selected ones of said features; and selectively reducing or expanding an area of said pixels on said border based upon said chain codes.

19. A method as recited in claim 18, comprising:

determining chain codes B1–B7 for a possible next boundary pixel for each pixel A on said boundary of said feature;

selectively reducing or expanding an area of each pixel A on said boundary according to said chain codes B1–B7 as:

B1—reduce area of pixel by $3/8$

B2—reduce area of pixel by $2/8$

B3—reduce area of pixel by $1/8$

B4—no reduction or expansion

B5—expand area of pixel by $1/8$

B6—expand area of pixel by $2/8$

B7—expand area of pixel by $3/8$; and generating a corner correction term based on said chain codes.

20. A method as recited in claim 19, comprising:

said chain codes B1–B7 having direction values of B1=5, B2=6, B3=7, B4=0, B5=1, B6=2 and B7=3;

said pixel A having a direction value of 8; and determining $\Sigma(Bi-A)$ over all pixels on said boundary as said corner correction term.

21. A method as recited in claim 1, comprising:

determining features in anatomic region using said images; and forming a tree structure of features in said binary images.

22. A method as recited in claim 21, comprising:

generating said images using a corresponding plurality of successively stricter gray-level thresholds;

wherein said step of forming tree structure comprises:
  selecting one of said images;
  detecting a first node within said one image;
  selecting a second one of said images generated at a next stricter gray-level threshold;
  detecting a second node within said second image; and
  determining if a position of said second node lies within a corresponding position of said first node in said second image.

23. A method as recited in claim 22, comprising:
determining a boundary of said first node; and
determining if a center of said second node lies within a corresponding boundary of said first node in said second image.

24. A method as recited in claim 22, comprising:
said CT scan comprising a plurality of CT sections; and
generating said plurality of images for each of said plurality of CT sections.

25. A method as recited in claim 1, wherein:
said step of detecting a nodule within said anatomic region comprises generating a plurality of binary images of said anatomic region at a corresponding plurality of different gray-level thresholds;
said method comprises:
  forming a histogram of gray values of pixels in said anatomic region;
  generating said plurality of binary images of said anatomic region at gray-level threshold values corresponding to pixel values at predetermined portions of an area under said histogram;
  detecting features in said anatomic region as suspected nodules; and
  detecting a boundary of each feature in each of said binary images.

26. A method as recited in claim 1, wherein:
said CT scan comprises a plurality of CT sections;
said step of detecting a nodule comprises generating a plurality of images for each of said CT sections;
said step of detecting a nodule comprises:
  determining features in anatomic region using said images;
  determining geometric descriptors for selected ones of said features; and
  using a rule-based system having rules based on said geometric descriptors to assign said selected ones of said features a likelihood of being a nodule; and
said method comprises using said rule-based system having rules determined from cumulative frequencies of said features being a nodule.

27. A method as recited in claim 26, comprising:
forming a tree structure defining as nodes said features detected in said plurality of images of said anatomic region;
determining plural of perimeter, area compactness, elongation, circularity, distance measure and total score as said geometric descriptors;
determining a boundary for said selected ones of said features;
wherein said step of using a rule-based system comprises:
determining whether one of said nodes has a corresponding node in an adjacent one of said plurality of images and, if said corresponding node is present in said adjacent one image deleting said one node and evaluating geometric descriptors of said corresponding node;
evaluating geometric descriptors of said one node if said corresponding node is not present.

28. A method as recited in claim 27, wherein said step evaluating geometric descriptors of said one node comprises determining whether said one node is said anatomic region.

29. A method as recited in claim 26, further comprising generating a analyzed CT scan with identified features in said anatomic region.

30. A method as recited in claim 27, wherein said CT scan comprises a plurality of CT sections; and
said method further comprises generating a plurality of analyzed CT sections each having identified features in said anatomic region.

31. A method as recited in claim 30, wherein said step of comparing comprises:
assigning each of said nodes a likelihood of being a nodule;
determining which of said analyzed CT sections contain nodes that have not been definitely identified;
comparing each of said analyzed CT sections having nodes that have not been definitely identified with adjacent ones of said analyzed CT sections; and
updating a likelihood of being a nodule for each node having a corresponding node in said adjacent ones of said analyzed CT sections to a likelihood of being a nodule of said corresponding node when said corresponding node has a more definite likelihood of being a nodule.

32. A method as recited in claim 31, wherein said step of comparing each of said analyzed CT sections comprises:
determining locations of all nodes in one analyzed CT section assigned a likelihood of being a normal anatomic feature;
determining nodes having corresponding locations in an analyzed CT section adjacent to said one analyzed CT section which overlap said locations each of said nodes in said one analyzed CT section;
updating a likelihood of being a nodule for each of said nodes in said one analyzed CT section based upon corresponding overlapping nodes.

33. A method as recited in claim 32, wherein said step of updating a likelihood comprises:
determining a first count of pixels of a first node in said one analyzed section;
determining a second count of pixels of nodes in adjacent analyzed CT sections determined to overlap said first node;
updating a likelihood of said first node based upon said first and second counts.

34. A system for the automated detection of lesions in computed tomographic (CT) scan, comprising;
an image generation device to generate said CT scan of an anatomic region;
a device for generating gray-level images of said CT scan at a plurality of gray-level thresholds; and
a device for analyzing features in said gray-level images;
wherein said device for generating gray-level threshold images comprises:
  a histogram generator which generates a histogram of gray-values of pixels in said CT scan;
  a threshold generator for determining a plurality of gray-level thresholds using said histogram; and
  a binary image generator for generating a respective plurality of binary images of said anatomic region using said gray-level thresholds;
said CT scan comprising a plurality of CT sections;

said binary image generator generating a respective plurality of binary images for each of said CT sections; and a tree structure generator producing a tree structure of features in said respective plurality of binary images for each CT section.

35. A system as recited in claim 34, comprising:

a feature detector for detecting features using said binary image of said anatomic region;

a geometric parameter generator to generate geometric parameters of said features; and a rule-based feature analyzer which analyzes said features using said geometric parameters.

36. A system as recited in claim 35, comprising:

said CT scan comprising a plurality of CT sections;

said rule-based feature analyzer generating a plurality of analyzed CT sections having features assigned a status indicating a likelihood of being a nodule;

a section comparer for comparing said plurality of CT sections and updating a status of a feature in one section based upon a status of a feature in an adjacent section.

37. A method for the automated detection of nodules in a computed tomographic (CT) scan of a subject, comprising:

detecting an anatomic region of said subject in said CT scan;

detecting a nodule in said anatomic region using a plurality of images of said anatomic region in said CT scan generated at different gray-level thresholds;

detecting features in said anatomic region as suspected nodules using said plurality of images;

determining geometric descriptors for selected ones of said features; and detecting said nodule using said geometric descriptors;

wherein said step of determining geometric descriptors comprises determining plural of perimeter, area, compactness, elongation, circularity, distance measure and total score for said selected ones of said features.

38. A method for the automated detection of nodules in a computed tomographic (CT) scan of a subject, comprising:

detecting an anatomic region of said subject in said CT scan;

detecting a nodule in said anatomic region using a plurality of images of said anatomic region in said CT scan generated at different gray-level thresholds;

detecting features in said anatomic region as suspected nodules using said plurality of images;

determining geometric descriptors for selected ones of said features; and detecting said nodule using said geometric descriptors;

wherein said step of detecting said nodule using said geometric descriptors comprises assigning each of said features a likelihood of being a nodule.

39. A method for the automated detection of nodules in a computed tomographic (CT) scan of a subject, comprising:

detecting an anatomic region of said subject in said CT scan;

detecting a nodule in said anatomic region using a plurality of images of said anatomic region in said CT scan generated at different gray-level thresholds;

detecting features in said anatomic region as suspected nodules using said plurality of images; and performing a corner correction routine on selected ones of said features.

40. A method for the automated detection of nodules in a computed tomographic (CT) scan of a subject, comprising:

detecting an anatomic region of said subject in said CT scan;

detecting a nodule in said anatomic region using a plurality of images of said anatomic region in said CT scan generated at different gray-level thresholds;

determining features in anatomic region using said images; and forming a tree structure of features in said binary images.

41. A method as recited in claim 40, comprising:

generating said images using a corresponding plurality of successively stricter gray-level thresholds;

wherein said step of forming tree structure comprises:
selecting one of said images;
detecting a first node within said one image;
selecting a second one of said images generated at a next stricter gray-level threshold;
detecting a second node within said second image; and
determining if a position of said second node lies within a corresponding position of said first node in said second image.

42. A method as recited in claim 41, comprising:

determining a boundary of said first node; and determining if a center of said second node lies within a corresponding boundary of said first node in said second image.

43. A method as recited in claim 41, comprising:

said CT scan comprising a plurality of CT sections; and generating said plurality of images for each of said plurality of CT sections.

* * * * *

UNITED STATES PATENT AND TRADEMARK OFFICE
CERTIFICATE OF CORRECTION

PATENT NO. : 5,881,124

DATED : March 9, 1999

INVENTOR(S): Maryellen L. Giger; Kyongtae T. Bae; Kunio Doi

It is certified that an error appears in the above-identified patent and that said Letters Patent is hereby corrected as shown below:

```
On the title page, before Item [54].
```

The present invention was made in part with U.S. Government support under grant number CA48985 (National Institute of Health). The Government has certain rights in the invention.

Signed and Sealed this

Eighth Day of June, 1999

Attest:

Q. TODD DICKINSON

*Attesting Officer*  *Acting Commissioner of Patents and Trademarks*